(12) United States Patent
Pinhas et al.

(10) Patent No.: US 12,216,592 B1
(45) Date of Patent: Feb. 4, 2025

(54) ENHANCING I/O PERFORMANCE USING IN-MEMORY RESERVATION STATE CACHING AT BLOCK STORAGE SERVICES

(71) Applicant: Amazon Technologies, Inc., Seattle, WA (US)

(72) Inventors: Barak Pinhas, Ganei Tikva (IL); Hen Guetta, Netanya (IL); Alex Friedman, Hadera (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/478,349

(22) Filed: Sep. 29, 2023

(51) Int. Cl.
*G06F 12/14* (2006.01)
*G06F 12/12* (2016.01)

(52) U.S. Cl.
CPC .......... *G06F 12/1466* (2013.01); *G06F 12/12* (2013.01)

(58) Field of Classification Search
None
See application file for complete search history.

(56) References Cited

U.S. PATENT DOCUMENTS

| | | | |
|---|---|---|---|
| 7,313,636 B2 | 12/2007 | Qi | |
| 9,747,039 B1* | 8/2017 | Coleman | G06F 3/0659 |
| 10,235,097 B2 | 3/2019 | Singh | |
| 11,544,000 B2 | 1/2023 | Furey et al. | |
| 11,580,041 B2 | 2/2023 | Prabhakar et al. | |
| 11,625,180 B1 | 4/2023 | Dinkar et al. | |
| 2012/0311604 A1* | 12/2012 | Achterberg | G06F 9/526 718/107 |
| 2017/0220474 A1* | 8/2017 | Dice | G06F 16/1767 |
| 2020/0125537 A1 | 4/2020 | Busick et al. | |
| 2020/0241613 A1 | 7/2020 | Lakshman et al. | |

OTHER PUBLICATIONS

U.S. Appl. No. 18/414,210, filed Jan. 16, 2024, Barak Pinhas, et al.
U.S. Appl. No. 18/478,581, filed Sep. 29, 2023, Barak Pinhas, et al.

* cited by examiner

*Primary Examiner* — Baboucarr Faal
(74) *Attorney, Agent, or Firm* — Robert C. Kowert; Kowert, Hood, Munyon, Rankin & Goetzel, P.C.

(57) ABSTRACT

A thread of a storage server determines that a command to modify a reservation record which comprises access permissions of an object stored at the server has been received. A version of the record is stored in an in-memory cache. The thread acquires a first lock associated with the record in exclusive mode, and a second lock in shared mode. The thread reads the cached version, constructs a modified version indicated in the command, and releases the second lock without updating the cache. After entries representing the modified version are stored in an operations journal, the thread acquires the second lock in exclusive mode and updates the cache. The thread then releases both locks. An indication that the command has succeeded is provided without verifying that the second version is stored at a metadata store.

20 Claims, 19 Drawing Sheets

Persistent reservation holders, registrants and non-registrants can be compute instances; the reserved entity is a logical volume, managed by the block-storage service (BSS), with a given logical volume supporting attachments to multiple compute instances Table 300

| Reservation Type | Reservation Holder | | Registrant | | Non-Registrant | | Reservation Holder Definition |
|---|---|---|---|---|---|---|---|
| | Read | Write | Read | Write | Read | Write | |
| Write Exclusive | Y | Y | Y | N | Y | N | One Reservation Holder |
| Exclusive Access | Y | Y | N | N | N | N | One Reservation Holder |
| Write Exclusive - Registrants Only | Y | Y | Y | Y | Y | N | One Reservation Holder |
| Exclusive Access - Registrants Only | Y | Y | Y | Y | N | N | One Reservation Holder |
| Write Exclusive - All Registrants | Y | Y | Y | Y | Y | N | All Registrants are Reservation Holders |
| Exclusive Access - All Registrants | Y | Y | Y | Y | N | N | All Registrants are Reservation Holders |

"Y" indicates that the command (read or write) is permitted according to NVMe 1.4 standard; "N" that the command is not permitted

*FIG. 3*

ENHANCING I/O PERFORMANCE USING IN-MEMORY RESERVATION STATE CACHING AT BLOCK STORAGE SERVICES

BACKGROUND

Advances in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments such as compute instances or virtual machines are frequently supported by block-based storage. Such block storage provides a storage system that is able to interact with compute instances through a series of standardized storage calls that render the block storage functionally agnostic to the structural and functional details of the logical volumes that it supports and the operating systems executing on the compute instances to which it provides storage availability. For some types of applications implemented at the compute instances, extremely low latencies may be required for input/output (I/O) operations directed to the logical volumes.

BRIEF DESCRIPTION OF DRAWINGS

FIG. 3 illustrates examples of persistent reservation types which may be supported for client compute instances accessing logical volumes of a block storage service, according to at least some embodiments.

Figure 1:
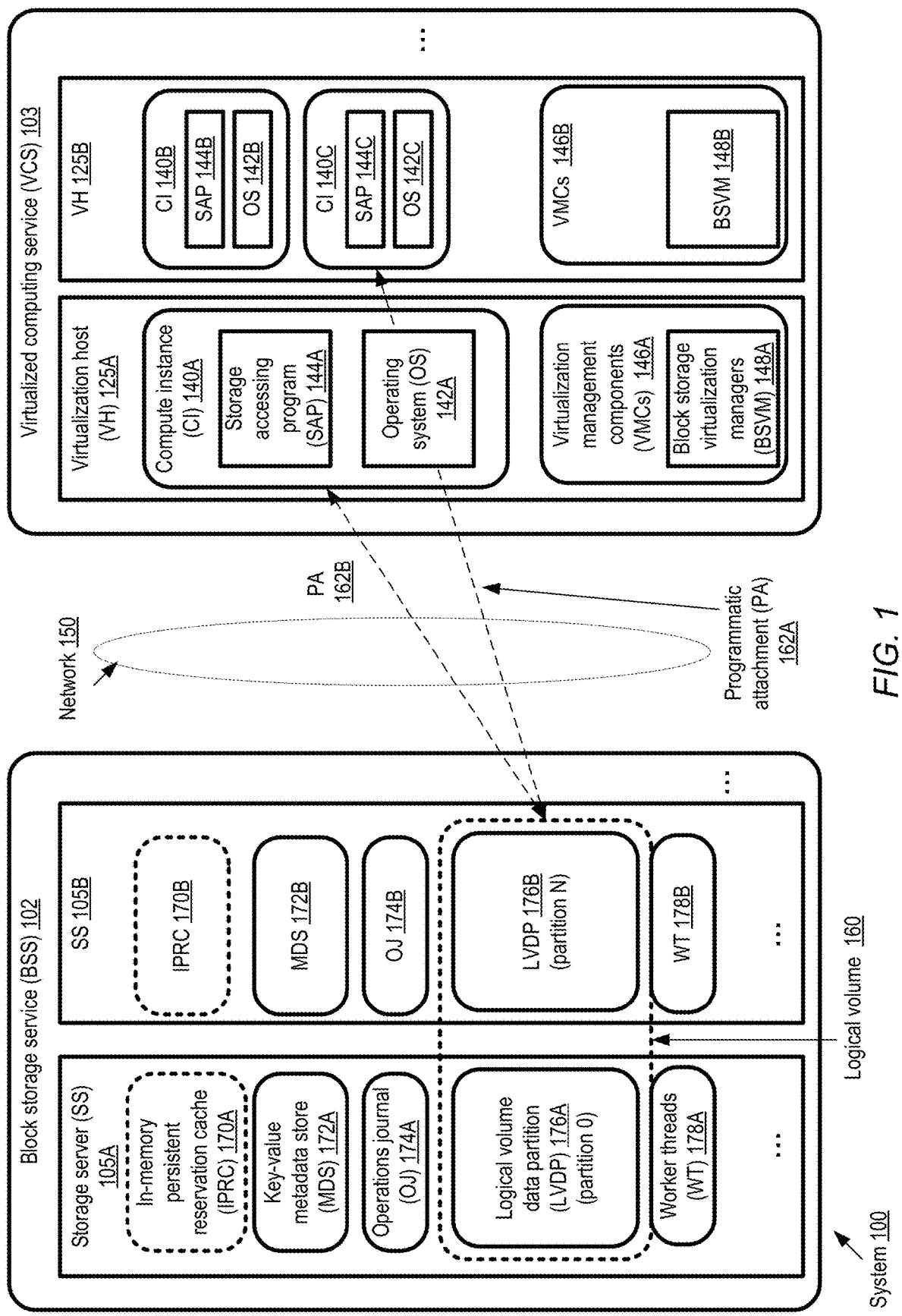
FIG. 1 illustrates an example system environment in which a coherent caching technique for persistent reservation records associated with logical volumes of a block storage service may be implemented to help support low-latency I/O operations, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

A block storage service can allow users to create and attach persistent storage volumes to their virtual machines or compute instances to store data. Multiple volumes may be attached to a single instance, and such a service can also include a multi-attach feature that enables users to attach a single volume to multiple instances. Each instance to which this shared volume is attached can have full read permission, and users can manage (and set up policies to manage) which instances have write access. For example, users can use NVMe (Non-Volatile Memory-Express) reservation protocols to create and manage reservations that control and coordinate access from multiple instances to a shared volume. Such reservations are used by shared storage applications to ensure data consistency.

However, checking the reservation status to determine the level of read and/or write access of a given instance to a shared volume may introduce latency into the input/output (I/O) path. To address this challenge, the present disclosure presents a coherent in-memory cache local to the storage server that is used to maintain a per-attachment permission set along with other reservation-state related attributes, which can be accessed as frequently as part of each I/O request to perform reservation checks and to reach a decision whether or not an I/O should be fenced. The present disclosure further presents systems and techniques to determine whether a client (that is, the component that enables a compute instance to connect to and perform I/O operations at a remote data volume) is replaying/reissuing a mutating I/O command, for example after a disconnection caused the client to not be informed whether the corresponding original mutating I/O was applied successfully at the server.

Accordingly, the present disclosure relates to methods and apparatus for ensuring, in scenarios in which persistent reservations are used to manage shared access to logical volumes of a block storage service (BSS), that input/output (I/O) commands directed to the logical volumes can be processed with very low latencies even when the reservations themselves are being changed. The persistent reservations supported for the logical volumes can be similar to those described in standards specification documents such as the Non-Volatile Memory Express (NVMe) 1.4 specification. Shared access to a given logical volume of a BSS can be provided, for example, to multiple compute instances of a virtualized computing service (VCS). In a block-based storage system, data is typically broken down into independent fixed-size blocks or pieces, with each block managed as an individual piece of data storage. A complete piece of information, such as a data file, is stored in multiple, potentially non-sequential blocks. A given logical volume of the BSS is a virtualized representation of a collection of blocks which can be mounted or attached to compute instances to store data to which read and/or write access is required by the applications (and/or the operating systems) of the compute instances.

The performance of the I/Os directed to volumes which support persistent reservations can be optimized by storing persistent reservation records (PRRs) within in-memory caches at the storage servers of the BSS, and by using multiple locks for the cached PRRs. The PRRs can indicate the specific permissions granted to various consumers or clients (such as compute instances) of the volumes or other storage objects managed at the BSS along with other metadata pertaining to the use of the storage objects; the term "persistent" indicates that the permissions-related metadata is intended to remain in existence across certain types of failures and other events. One lock for a given PRR can be used to ensure that changes to reservation state (e.g., read and write permissions granted to storage consumers) are applied in serial order, and another lock for the same PRR can be used to enable I/O commands directed to the logical volume data to make progress (after reading a currently-cached PRR to check permissions for the I/O commands) even though the process for updating the reservation state is underway.

In addition to supporting high-performance I/Os using such caching and locking algorithms, techniques introduced herein can also help the handling of re-submitted mutation commands after network connectivity has been re-established between a compute instance and a storage server. Commands that (if completed successfully) result in a change or mutation of the state of the data of a logical volume, or of the state of a PRR, are referred to as mutation commands herein. A mutation history store (MHS) and command sequence numbers (CSNs) can be used to determine whether a given mutation command is a re-submission of an older completed command (for which a completion acknowledgement was not received, due to an unplanned connectivity outage at the compute instance from which the command was submitted) or not. Without the use of the CSNs and the MHSs, depending on the order in which the network disconnect and reconnection occurs relative to reservation state changes, it can become problematic to determine how to process a mutation command or request after the reconnection.

A BSS can be referred to in various implementations as an elastic block storage service, a cloud disks service, a managed disk service, a cloud block storage service, a persistent disk service, or a block volumes service. Attachment between a volume and an instance refers to the establishment of a connection between a client of the instance and the volume. This connection may be referred to as a "lease" in some implementations, and it enables to instance to view the volume as if it were a local storage drive, even though the volume and instance may be hosted on different physical machines and communicating over a network. The term BSS client or storage client represents instructions that enable a compute instance to connect to, and perform I/O operations at, a remote data volume (e.g., a data volume stored on a physically separate computing device accessed over a network). The client may be implemented on an offload card that is connected to and controls the server that includes the processing units (e.g., CPUs or GPUs) used by the compute instance. As used herein, the term "storage server" or drive "hosting" a volume refers to that storage device storing at least a portion (e.g., a partition, a set of blocks, recently logged data, or flushed data) of the data of the volume and implementing instructions for managing that portion of the volume (e.g., handling I/O to and from the volume, replication of the volume, transfer of volume data to and from other storage systems). The storage volumes managed at a BSS can be referred to in various implementations as virtualized block storage volumes, cloud disks, storage disks, cloud volumes, disks, block volumes or simply as volumes. In general, a volume can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary (non-primary) replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary or non-primary replicas.

As indicated above, a BSS can support NVMe reservations for managing access control to at least some volumes (such as volumes which can each be attached to multiple compute instances using the multi-attach capability). NVMe reservations is a set of industry-standard storage fencing protocols, which enable users to create and manage reservations that control and coordinate access from multiple instances to a shared volume. Reservations can be used by shared storage applications to ensure data consistency. The BSS can support commands to register, unregister or replace a reservation key as defined in the NVMe specification. A registration key can be used to identify and authenticate an instance. Registering a reservation key with a volume creates an association between the instance and the volume. In some implementations, an instance may have to be registered with a volume before the instance can acquire a reservation. The BSS can also support commands to acquire a reservation on a volume, preempt a reservation, and/or abort a reservation. A variety of reservation types defined in NVMe specifications can be supported by a BSS, including but not limited to Write Exclusive, Exclusive Access, Write Exclusive—Registrants Only, Exclusive Access—Registrants Only, Write Exclusive—All Registrants and Exclusive Access—All Registrants. Commands to release or clear a reservation held on a volume, and provide a reservation report (e.g., a description of a registration and reservation status of a volume) can also be supported by a BSS. In NVMe terminology, the term "namespace" refers to a collection of logical block addresses accessible to host software (e.g., software running at a compute instance or a virtualization host of a virtualized computing service). A namespace ID is an identifier used by an NVMe controller to provide access to a namespace. A namespace does not necessarily refer to a physically isolated set of blocks, but rather represents an isolation of logical blocks addressable by the software. Namespaces can be represented in different ways depending on the operating system being used at the host or server from which storage is being accessed. For example, in some operating systems, a unique identifier such as /dev/nvme0n1 may be used to refer to a namespace 1 (n1) of controller 0 (nvme0). The available storage may be divided into namespaces for a variety of reasons, such as for logical isolation, multi-tenancy, security isolation (e.g., encryption per namespace), write-protecting a namespace for recovery purposes, and so on. In the context of a BSS, a volume (or a portion of a volume) can correspond to, or be represented as, an NVMe namespace. As defined in the NVMe standard, a controller is an interface between a host (from which storage-related commands are issued) and the NVMe storage subsystem. There can be several types of controllers, such as I/O controllers, discovery controllers and administrative controllers. In some implementations in which the BSS is being used for storage volumes accessed by compute instances running on virtualization servers of a VCS, NVMe controllers may represent one layer of software run at the virtualization hosts, and the "host" layer (in the NVMe sense) may comprise another layer of software at the virtualization hosts.

The techniques introduced herein for optimizing I/O performance and for handling network disruptions can be implemented at a BSS of a cloud provider network or cloud computing environment which also includes a VCS. Virtual machines or compute instances can be set up on behalf of VCS clients, and programmatically attached to virtualized logical volumes set up at the BSS to provide desired levels of I/O performance and storage availability. Depending on its size, a given logical volume can be divided into numerous sub-units referred to as partitions, with multiple replicas of each partition being stored at respective storage servers (also referred to as storage units) of the BSS for enhanced availability. A given storage server can include one or more sets of storage devices at which contents of the partitions and associated metadata are stored, as well as a main memory whose contents can be accessed more rapidly that the contents of the storage devices. Any of a variety of storage technologies can be utilized for the logical volumes, including for example solid-state drives (SSDs) implementing programmatic commands of NVMe or similar standards, magnetic disk drives, and so on. In some cases, RAID (random arrays of independent/inexpensive disks) arrays can be utilized for the volumes, or SLEDs (single large expensive disks) can be used. In response to requests or commands submitted using application programming interfaces (APIs) or other programmatic interfaces, multiple compute instances can be attached to a given logical volume, or a given partition of a given logical volume, with potential concurrent accesses from the different compute instances to the volume being managed with the help of PRRs. The PRRs can be modified to change the read or write permissions granted to a given compute instance, to add new compute instances to the set of compute instances that can read or write the volume, or in other ways, based on mutation commands submitted from attached compute instances on behalf of applications running at the compute instances. In some cases mutation commands issued by an administrator of the logical volume via programmatic interfaces supported by the BSS, instead of being submitted from the attached compute instances.

A fault-tolerant protocol for the distribution of volume reservation state information among the different storage servers used for the partitions of the volume, and among the compute instances attached to the volume, can be implemented. The protocol can utilize the existing connections established between the compute instances and the storage servers for I/O operations, without requiring new connections to be set up for the distribution of reservation state. One of the storage servers being used for the logical volume can be designated as the coordinator of changes to the reservation state; as such, requests to modify the reservation state can be sent initially to the designated coordinator according to the protocol. If/when a change to reservation state is approved by the designated coordinator, a persistent reservation sequence number (PRSN) associated with the reservation can be incremented to reflect the change. The PRSN can serve as an indicator of the version of reservation state which has been approved or applied by the designated coordinator. A PRSN, indicative of the currently-known state of the PRR as at a compute instance, can be included with I/O requests submitted from the compute instance to the storage server at which a targeted partition of the volume is stored. A PRSN submitted with an I/O request to a given storage server can be compared with a locally stored PRSN by that storage server to determine whether the version of reservation state known at the compute instance from which the I/O request is received is up-to-date or not. If the version is not up-to-date, the compute instance can be informed of the staleness of its reservation metadata by the storage server, and the compute instance can obtain the updated version of the reservation state from the designated coordinator.

At a given storage server at which a particular partition of a logical volume is stored, a persistent metadata store (MDS) can be used to hold the approved or committed version of a PRR which indicates the permissions granted to the compute instance(s) attached to the logical volume. In addition to the PRR, other metadata such as a mutation history store (used to handle potentially re-submitted requests from compute instances) can also be included in the MDS. A multi-stage update algorithm can be implemented to change the contents of the MDS. For example, records of metadata changes (such as updates to reservations) can first be replicated in a sequentially-written operations journal, and the changes can eventually be propagated asynchronously from the journal to the MDS by a commit propagator as part of a lazy commit operation for the changes. The operations journal can be organized for example as a circular buffer which is overwritten when it gets full. The operations journal can be designed to enable writes to be completed faster (e.g., using append-only operations which take less time than writes to specified distinct per-write offsets) than writes performed to the persistent metadata store. Individual ones of the entries written to the journal can include sequencing information which can be used by the commit propagator to determine the order in which the operations recorded in the entries should be applied to the storage devices at which the authoritative or final versions of the targeted data or metadata are stored as part of the MFS. A response indicating the success of a given mutation command (such as a command to modify a reservation, or a command to write a portion of data of the volume) can be provided to the submitter of the command as soon as the corresponding journal records are replicated, without waiting for the propagation of the changes to the MDS.

A storage server of the BSS can comprise numerous worker threads responsible for implementing volume data I/O commands and/or PRR-related commands. In order to determine whether a given mutation command should be accepted or rejected, the reservation state information of the targeted volume, recorded in a PRR, can be consulted by a worker thread to which the mutation command is assigned at a storage server. Note that at least two types of mutation commands can be received at or assigned to a worker thread—commands that include write operations to the data of the logical volume, and commands that include write operations to the PRR itself. A given mutation command can in some cases indicate several different lower-level operations to be performed—e.g., a read-modify-write sequence of operations can be indicated in a mutation command, indicating that a portion of data is first to be read, then modified (e.g., by performing a logical operation based on the value that was read), and then written. As such, fulfillment of a given mutation command can require several operations instead of a single atomic operation.

Instead of trying to access the latest version of the PRR from the MDS (which can in some cases require a delay for outstanding commits to be propagated from the journal), the worker thread can examine a version of the PRR stored earlier (as a result of copying the PRR from the MDS) in the in-memory cache of the storage server. To help decrease the latencies for I/O requests directed to the logical volume, access to the PRR stored in the cache can be managed using at least a pair of locks: a change-sequencing-lock (CSL) and a reading-writing-lock (RWL). The CSL can be used to ensure that updates directed to the PRR itself are serialized (and applied in PRSN order), while the RWL can be acquired in shared mode to enable a worker thread to check whether an I/O command assigned to the worker thread is permitted or not.

An algorithm for managing updates to the PRR, which reduces the windows of time during which I/O operations to the data of the logical volume while still maintaining the consistency of the cached PRR, can be implemented using logic similar to the following. A worker thread WT1 can be assigned the task of changing a PRR from its current version V-p to a new version V-q. WT1 can begin by acquiring the CSL associated with the PRR in exclusive mode. As long as WT1 holds the CSL in exclusive mode, no other worker thread can update the PRR; as such, use of the CSL ensures that updates to the PRR are applied in the order in which the commands to modify the PRR are received. WT1 can then acquire the RWL associated with the PRR in a shared mode (i.e., in a mode in which multiple worker threads can concurrently hold the RWL), read the V-p version of PRR from the local in-memory cache, and generate the V-q version, without actually updating or overwriting V-p in the cache. After the V-q version is generated, the RWL can be released, and entries representing the V-q version can be stored in the replicated operations journal used at the storage server to help speed up responses to metadata change commands. After the entries have been successfully stored in the operations journal, a response indicating that the mutation command has been completed successfully can be sent to the submitter of the mutation command. The RWL can now be acquired in exclusive mode by WT1, the version V-p in the cache can be replaced by the version V-q, and the RWL lock can be released. While the RWL lock is held in exclusive mode, no other thread can read (or update) the cached version of the PRR. Preventing reads of the cached version at this stage ensures that no worker thread can read a partially-written and hence potentially inconsistent version of the PRR. The CSL can also be released after the V-q version is written into the cache, enabling other updates to the PRR to be scheduled in the order in which the update commands are received. The PRSN associated with the PRR can be updated if needed. Note that the PRSN need only be updated at the designated coordinator storage server for the PRR, while mutations to the PRR can be applied at all the storage servers at which partitions of the logical volume are stored.

During those steps of the PRR mutation operations in which the RWL for the PRR is not held in exclusive mode by WT1, other worker threads can acquire the RWL in shared mode, read the current reservation state from the cache, and perform I/O operations submitted from compute instances if the current reservation state permits the I/O operations. By design, the period for which the RWL is held in exclusive mode is kept very short, so that I/Os of other worker threads can proceed during most of the time required for processing a PRR mutation command. Of course, an I/O of another worker thread can only be performed if the I/O is permitted by the PRR, and if the PRSN indicated in the I/O request does not have to be updated at the compute instance at which the I/O command originates. By using the multi-lock technique outlined above, it becomes possible to achieve higher levels of concurrency and extremely short latencies for most I/O commands, despite the fact that PRRs can be updated at any time.

Commands can be sent from compute instances that are programmatically attached to a given logical volume (referred to as client compute instances with respect to the logical volume and the BSS) via network connections to the storage servers at which partitions of the logical volumes are stored. Connectivity between a client compute instance and a storage server at which a partition is stored can sometimes be disrupted, and later re-established. It can be the case that the compute instance submits a mutation command, the operations indicated in the command are completed at the storage server based on checking the permissions indicated in the PRR, and a network disruption results in an acknowledgement of completion of the command not being received at the compute instance. When the connectivity is re-established, the compute instance can re-submit the mutation command because the acknowledgement was not received. Meanwhile, the PRR can be modified in such a way, prior to the receipt of the re-submitted command, that the operations indicated in the mutation command are no longer permitted. From the perspective of the storage server, determining how to process the re-submitted command can be problematic, especially if the storage server is not able to tell whether the command is a new mutation command or a re-submission. Rejecting the command due to the current permissions indicated in the PRR, for example, is not a good option since the requested changes have actually been applied, and returning a response indicating that the reservation prohibits the command can therefore be misleading. Accepting the command can also be problematic, if it turns out that the command was not actually a re-submission, since the current reservation state prohibits the command.

In order to alleviate such problems, a mutation history store (MHS) containing a record of some number of most-recently completed (e.g., committed) mutation operations can be maintained in the MDS by the storage server, and a monotonically increasing command sequence number (CSN) can be assigned to each mutation command by the compute instance at which the command originates. The CSNs corresponding to the mutation commands can also be stored in the MHS. A max-CSN (maximum CSN) indicating the most recent mutation command which has been successfully completed by the storage server (after checking reservation permissions) on behalf of individual ones of the compute instances can be maintained by the storage server. If, after a reconnection, a mutation command with a CSN less than max-CSN is received, the storage server can examine the MHS (which can also be referred to as a mutation history buffer or command history buffer) to determine whether the recently-received mutation command is a re-submission or not. If it is a re-submission, depending on whether the mutation command was directed to the PRR or to the logical volume's data, different actions can be taken. If the command is a re-submission and is directed to the PRR, a success indicator can be sent to the submitter; and if the command is a re-submission and is directed to the logical volume data, one or more lower-level operations indicated in the command can be re-processed or re-implemented (e.g., if it was a read-modify-write, the targeted data can be read and modified if needed). In some cases, if the command is identified as a re-submission, a result status indicator for the original command can be obtained from the MHS and sent to the command submitter, e.g., instead of re-performing operations of the original command.

As one skilled in the art will appreciate in light of this disclosure, certain embodiments may be capable of achieving various advantages, including some or all of the following: (a) ensuring that extremely short latencies can be supported for I/O operations directed to logical volume data from compute instances and other clients, even in scenarios in which NVMe-style persistent reservation records which are used to store access permissions to the logical volumes can be modified at any time and (b) ensuring that the consistency and integrity of mutations directed to logical volumes protected using NVMe-style persistent reservations is maintained despite temporary network disconnects followed by reservation changes and re-submissions of mutation commands. Note that although NVMe-compliant reservations and block-oriented storage services are used as examples in this document, the techniques introduced herein are not restricted to any particular way of defining and assigning access permissions to storage objects, or to any particular way of organizing the storage (e.g., regardless of whether the storage is organized as a collection of logical volumes or not). The techniques described herein can be used with equal success regardless of the access permission scheme used, the manner in which storage is organized at the storage devices used, and the interfaces used to access the storage objects.

According to some embodiments, a system may comprise some number of storage servers of a BSS, a persistent metadata store (MDS), and a commit propagator associated with the MDS. The BSS may be implemented as one of a suite of network-accessible services of a cloud provider network or cloud computing environment. A storage server (SS) may include one or more processors at which a plurality of worker threads run, a main memory, and a set of storage devices. Individual worker threads may be assigned the responsibility of processing respective I/O commands and/or reservation-related commands, e.g., by a command scheduler or thread scheduler of the SS. The set of storage devices may store a portion (e.g., a partition) of a logical volume LV1, and a first replica of a plurality of replicas of an operations journal. The portion of LV1 may be stored at a separate storage device (or devices) than the device used for the journal. The MDS may include one or more metadata records associated with LV1, including a PRR indicating a set of access permissions granted, with respect to LV1, to one or more compute instances which are programmatically attached to the logical volume. The PRR may also be referred to as a permission metadata record or an access permission record (APR). Note that compute instances represent just one example of storage consumers or storage-related command submitters; in at least some embodiments, logical volumes or other storage objects managed by a BSS may be accessed from other types of entities (such as servers implementing machine learning tasks of a machine learning service of a cloud provider network).

A first worker thread WT1 of the storage server may receive (e.g., from a thread scheduler running at the storage server) a command or request to modify or mutate the PRR. Any of several kinds of changes that are to be applied to the PRR to update the state of the reservation may be indicated in the command, such as an indication of an additional compute instance to which read access is granted, a change of the type of access (read versus write) granted to one or more compute instances, and so on. In at least some embodiments, the PRR may indicate permissions granted in accordance with the persistent reservation functionality described in an NVMe specification or a similar specification for storage devices. The command to modify the RR may have originated at a program running on one of the attached compute instances in some cases; in other cases the command may have been submitted to the BSS via a programmatic interface such as a web-based console by an administrator of the logical volume.

In response to receiving the command to modify the reservation record, WT1 may acquire, in exclusive mode, a state-change-sequencing lock (CSL1) associated with the PRR in various embodiments. A first version of the PRR, PRRv1, may currently be stored in a cache in the main memory of the storage server. The cache may have been populated earlier by copying PRRv1 from the MDS. During the interval for which CSL1 is held in exclusive mode by the first worker thread, other worker threads may be prevented from initiating the process of modifying the reservation record in various embodiments.

After acquiring CSL1 in exclusive mode and thereby preventing any other threads from concurrently modifying the PRR, WT1 may acquire a reading-writing lock (RWL1) associated with PRR. WT1 may then read the contents of PRRv1, prepare a modified version PRRv2 of the PRR in accordance with the changes indicated in the request to modify the PRR, and release RWL1. PRRv1 may not be overwritten or replaced in the cache at this stage. WT1 may cause journal entries that include PRRv2 to be prepared and stored in a plurality of replicas of the operations journal, such as the local replica at the storage server, and a second replica at a second storage server in at least some embodiments. After WT1 is able to confirm or verify that multiple replicas of entries have been stored in the journals, an indication that the command to modify the PRR has succeeded may be transmitted to a submitter of the command in various embodiments, without WT1 verifying that the new version of PRR has been stored at the MDS.

WT1 may next re-acquire RWL1, this time in exclusive mode in various embodiments. While holding RWL1 in exclusive mode, which prevents read or write access to the PRR from any other worker thread, WT1 may store the new version of PRR, PRRv2, in the in-memory cache of the storage server, in effect updating the cache. After the cache has been updated, both RWL1 and CSL1 may be released by WT1 in various embodiments.

Note that during many of the operations performed by WT1 to respond to the request to modify the PRR, other worker threads may be able to access the currently-in-cache version of PRR (PRRv1), and use PRRv1 to check whether an I/O command submitted to the storage server from an attached compute instance is permitted or not. Each such I/O command may include a persistent reservation sequence number (PRSN) as indicated above, and the PRSN in the command may be compared to the PRSN in PRRv1 to determine whether the PRRv1 is the appropriate version of the PRR for making I/O request acceptance/rejection decisions. When the changes to the PRR are committed, the PRSN may officially be incremented in the cache (in addition to being incremented in the MDS) in various embodiments.

A second worker thread WT2 may receive an I/O command directed to the portion of LV1 stored at the storage server while WT1 retains CSL1 in exclusive mode, but does not hold RWL1 in exclusive mode. In response, WT2 may acquire RWL1 in shared mode, read PRRv1 from the cache and release RWL1, and determine from PRRv1 whether the requested I/O operation is permitted by PRRv1. If the operation is permitted, it may be initiated by WT2; otherwise, a response indicating a lack of permission to perform the I/O may be sent to the transmitter. The contents of entries stored in the operations journal which indicate updated version of the PRR may be copied to the MDS asynchronously (from a selected copy of the operations journal) in accordance with a commit protocol by the commit propagator in various embodiments. In some embodiments, according to the commit protocol, entries stored in the operations journal may be copied to the MDS based on sequence numbers stored in the entries, and such transfers may be initiated based on factors such as the proportion of the journal which is full and/or the duration for which an entry has remained in the journal.

In at least some embodiments, each portion or partition of LV1 may be stored or replicated at several storage servers of the BSS, with one of the storage servers being designated as the primary server for a given partition, while other servers are designated as non-primary servers for the partition. In one such embodiment, the replicas of the operations journal may also be stored at distinct storage servers—e.g., the storage server designated as the primary for a partition may store one replica of the operations journal, while another storage server designated as a non-primary for the partition may store a second replica of the operations journal for enhanced availability and fault tolerance. In at least some embodiments, the cache for reservation records may only be maintained at the primary storage server; the non-primary storage servers may not need to maintain PRRs in a cache (until their role is change to primary, e.g., due to a failure at the current primary). In some embodiments, the MDS may be implemented at a storage device that is accessible from both the primary storage server designated for a partition of LV1, and one or more non-primary storage servers for the partition. In other embodiments, a respective copy of the MDS may be stored at the primary storage server and one or more non-primary storage servers. In some embodiments, the commit propagator associated with a partition may comprise a process or thread running at the primary storage server of the partition. In other embodiments, the commit propagator may run at a server other than the primary storage server.

According to some embodiments, a system may include a storage server of a BSS of a provider network, and a virtualization host of a VCS of the provider network. At least a portion of a logical volume LV2 may be stored at the storage server, and the compute instance may be programmatically attached to LV2. One or more processes or threads of the storage server may receive a first mutation command via a first network connection from the compute instance. The first mutation command may indicate one or more operations (including at least one operation that modifies LV2 data or associated metadata) to be performed at the storage server. In general, mutation commands directed to the storage server may indicate that a reservation record (PRR) for LV2 is to be modified in some way, or that data of LV2 is to be modified (e.g., as a standalone write, or by performing a non-atomic sequence of operations such as a read-modify-write). The first mutation command may include a first command sequence number (CSN) assigned at the compute instance to the first mutation command to indicate an order in which the first mutation command was submitted relative to other mutation commands from the compute instance.

Upon receiving the mutation command, in various embodiments the storage server (i.e., the processes or threads of the storage server) may verify, using LV2's PRR, whether the compute instance has permission for the operations indicated in the command. In at least some embodiments, the PRR may be stored at, and read from, an in-memory cache protected using multiple locks (such as the CSL and RWL) as discussed earlier. If the compute instance has the needed permissions, the operations may be performed, and a record representing completion of the first mutation command may be stored in a mutation history store (MHS). The record may include the first CSN. In at least some embodiments, the record may be added to the MHS when the changes indicated in the mutation command are committed (i.e., when the changes are propagated to an MDS or to LV2). An MHS can also be referred to as a mutation history buffer.

Due to any of a variety of reasons, such as hardware glitches or software bugs or failures, connectivity between the compute instance and the storage server may be temporarily disrupted, e.g., before an indication or acknowledgement that the first mutation command has been fulfilled has been sent to or received at the compute instance. Later, the connectivity may be re-established, e.g., as a result of the submission of a re-connection request from the compute instance to the storage server. In response to receiving a re-connection request from the compute instance after such an unplanned termination of the first connection, the storage server may establish a second network connection to replace the first connection. Several messages may be exchanged between the compute instance and the storage server, and these messages may be referred to as a re-connection handshake. At the storage server, a max-CSN indicating the highest CSN included in the MHS with respect to mutation commands originating at the compute instance may be computed, also in response to the re-connection request, and sent to the compute instance as part of the re-connection handshake. In effect, in cases in which the max-CSN exceeds the first CSN, transmission of the max-CSN may indicate that the storage server has completed one or more mutation commands received after the first mutation command was received or completed.

The PRR associated with LV2 may be modified, e.g., using the locking techniques similar to those described above, in such a way that the operations indicated in the first mutation command are no longer permitted. After the PRR is modified, mutation commands, each including a respective CSN, may continue to be received from the compute instance and processed at the storage server. If the CSN of such a mutation command exceeds the max-CSN that was sent to the compute instance, the new version of the PRR may be consulted to determine whether the compute instance has permission for the operations indicated in the mutation command. However, in some cases, because the compute instance has not received an acknowledgement of the first mutation command, the compute instance may send another mutation command, which indicates the same operations that were indicated in the first mutation command, and also includes the first CSN which was originally sent with the first mutation command. Upon receiving such a mutation command with a CSN lower than max-CSN, the storage server may look up entries in the MHS (using the CSN included in the command) to determine whether the latest mutation command represents a re-submission of an earlier command which was successfully completed.

In response to verifying that the new command is a replay or re-submission of the first mutation command, and determining that the first mutation command was directed to modifying the data of LV2 (as opposed to modifying the reservation record or other metadata of LV2) in some embodiments the operations indicated in the first mutation command may be re-performed without checking the permissions currently indicated in the PRR. Re-checking the PRR may not be required in the case of a replayed mutation command that has an entry in the MHS, because the existence of the entry in the MHS indicates that the compute instance from which the command was received had the needed permissions at the time of the original mutation (otherwise there would not be a matching entry stored in the MHS). Such a re-performing of the operations may be needed, for example when there are several operations which are collectively non-atomic (such as a read-modify-write sequence) indicated in the first mutation command and in the re-submitted version of the mutation command. Another reason for re-performing the operations may be that a write operation indicated in the first mutation command was directed to two different partitions (referred to as a split I/O), and one of the original partitions to which the write operation was merged with another partition, leading to a corresponding merge of the MHSs of the two partitions that were merged. In such a scenario, the entire write (which was originally split across two partitions but now is directed to a single merged partition) may have to be completed before sending a success indicator to the compute instance. For some types of re-submitted mutation commands, such as commands to modify the PRR, a response indicating successful completion of the command may be sent as an acknowledgement to the compute instance from which the command was received, without re-performing the operations indicated in the mutation command.

In at least some embodiments, for mutation commands which include write operations directed to the logical volume LV2 (as opposed to writes directed to LV2's PRR), the corresponding entries stored in the MHS may indicate the offset within LV2 at which the write was performed, and a size of the write. The offset and/or size information may be used to verify whether a mutation command is a re-submission or not; if it is a re-submission as suggested by a matching CSN less than max-CSN, the size and offset should also match the size and offset stored in the MHS entry.

In various embodiments, replicated operations journals such as those described earlier may be utilized to speed up responses to mutation commands (both original mutation commands and re-submitted mutation commands). For example, a message indicating successful completion of a given mutation command may be sent to the submitter of the command as soon as respective entries representing the mutation are written to multiple replicas of the journal, without waiting for the propagation of the mutations to the storage devices used for LV2 or LV2's MDS.

In at least some embodiments, as indicated above, a BSS and/or a VCS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be programmatically attached to logical volumes implemented at a BSS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the BSS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS and the BSS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the BSS and/or the VCS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a coherent caching technique for persistent reservation records associated with logical volumes of a block storage service may be implemented to help support low-latency I/O operations, according to at least some embodiments. As shown, system 100 includes resources and artifacts of two network-accessible services of a cloud provider network: a BSS 102 and a VCS 103. The BSS may include a collection of storage servers (SSs), such as SS 105A and 105B. A given SS may include a set of processors, a memory and one or more sets of storage devices. The VCS may include a collection of virtualization hosts (VHs), such as VH 125A and VH 125B, each of which may also include a set of processors, a memory and one or more storage devices. Compute instances or virtual machines may be launched at the VHs on behalf of clients of the VCS with the help of virtualization management components (VMCs) such as VMCs 146A or VMCs 146B in the depicted embodiment. For example, compute instance (CI) 140A may be set up at VH 125A, while CI 140B and CI 140C may be launched at VH 125B. A given compute instance may include one or more application programs (such as programs which access data stored at logical volumes managed by the BSS) and an operating system. For example, CI 140A may include storage accessing program (SAP) 144A and an operating system (OS) 142A, CI 140B may include SAP 144B and OS 142B, while CI 140C may include SAP 144C and OS 142C. Commands to perform I/O at logical volumes, and/or to modify reservation records, may be transmitted from a compute instance to a BSS storage server based on input received from an application such as a SAP at lower-level components of the hardware/software stack used for the compute instances (such as storage access managers within operating systems or virtualization management components) in various embodiments.

Storage needs of application programs and/or operating systems of the CIs may be satisfied using a variety of techniques in different embodiments, including programmatically attachment of the CIs to logical volumes whose partitions are stored at the SSs of the BSS. A logical volume may be created at the request of a client of the VCS, and attached to one or more of the client's CIs, in response to one or more programmatic requests directed to the VCS in some embodiments. In other embodiments, at least one logical volume may be created and automatically attached to a given compute instance by the VCS control plane at the time that the compute instance is launched. In the example scenario shown in FIG. 1, a logical volume 160, divided into N partitions, has been set up at the BSS. Logical volume data partition (LVDP) 0 176A of the volume is stored at the storage devices of SS 105A, while LVDP N 176B is stored at the storage devices of SS 105B. Note that while a partition of only a single logical volume 160 is illustrated at each SS of FIG. 1, in at least some embodiments a given SS may store one or more partitions of one or more logical volumes.

Programmatic attachment 162A enables I/O commands (such as reads and writes) to be directed to any of the LVDPs of logical volume 160 from CI 140C via a network 150, while programmatic attachment 162B enables I/O commands to be directed to the LVDPs from CI 140A via the network. In at least some embodiments, the VMCs of a VH may include respective block storage virtualization managers (BSVMs), such as BSVM 148A at VH 125A and BSVM 148B at VH 125B, that act as intermediaries between the compute instances at those VHs and the BSS. For example, I/O commands directed to logical volume data, persistent reservation record access or mutation commands, and the like that originate at the CIs may be intercepted at the BSVMs, transformed if needed, and sent on to the SSs by the BSVMs. Responses to the commands may be received from the BSS at the BSVMs and forwarded to the CIs. In at least one embodiment, VMCs such as BSVMs may also be responsible for establishing network connections on behalf of the compute instances—e.g., when a compute instance is attached to a logical volume (or when a compute instance attempts to re-establish connectivity with a logical volume), respective network connections may be set up by the VMCs between the CI and each of the SSs at which a partition of that logical volume is stored. The VMCs may in effect act as agents of the CIs with regard to I/O operations and reservation-related operations associated with the attached logical volumes. The compute instances may be referred to as storage clients or storage consumers with respect to the BSS.

Read and write accesses to the logical volume 160 may be managed with the help of persistent reservation records (PRRs) in the depicted embodiment. Such PRRs may enable sharing of logical volume data among multiple CIs such as CI 140A and CI 140C in accordance with standards similar to NVMe version 1.4 in some embodiments. The access permissions that are to be granted to different compute instances may be specified (and if desired, modified) via application programming interfaces (APIs) supported by the BSS in some embodiments. Such APIs may be invoked, for example, from the attached CIs and/or by administrators (e.g., the customers of the VCS on whose behalf the CIs and logical volumes are set up) using web-based consoles. In some cases, applications run at the CIs may provide input to other components of the software/hardware stacks of the VHs (such as operating systems or VMCs) which results in the invocation of the APIs.

A respective key-value metadata store (MDS) may be accessible from, or stored at, individual ones of the SSs to maintain metadata related to the logical volumes whose partitions are stored at the SSs, including the PRRs pertaining to the logical volumes. MDS 172A is accessible from SS 105A, while MDS 172B is accessible from SS 105B. In addition to the PRRs, the MDSs may also store mutation history stores (MHSs) in some embodiments, as discussed in further detail below. MHSs may be used to store records of up to a selected number of recently-completed mutation commands with respective command sequence numbers (CSNs), enabling the SS to determine whether a particular mutation command from a compute instance is a replay or re-submission or a new command. The ability to distinguish new commands from re-submitted commands may be important to avoid potential inconsistencies in the logical volume data in scenarios in which temporary problems at network 150 cause disconnects between the CIs and the SSs, with connectivity being re-established after the disconnects are detected.

An SS may include a collection of worker threads, such as worker threads (WT) 178A of SS 105A and WT 178B of SS 105B. When a command such as a logical volume data I/O or a command to modify a PRR is received at an SS, a thread scheduler running at the SS may assign the command to a selected worker thread for implementation. A given pool of WTs at an SS may include hundreds or even thousands of worker threads, which can perform I/O operations requested by the CIs in parallel to increase overall throughput and reduce average latency.

SAPs run at the CIs 140 may require very low latencies (e.g., less than a few milliseconds) for individual I/Os, including write I/Os that may have to be persisted at the LVDPs in the depicted embodiment. For a given I/O operation, permissions granted to the requesting CI may have to be checked using a PRR; furthermore, the PRRs themselves may be modified at arbitrary points of time based on command received from the CIs or administrators. Several techniques may be implemented to help support high performance and low-latencies for I/Os given such requirements in the depicted embodiment. The PRRs themselves may be cached in the memory of the storage server, e.g., in in-memory persistent reservation cache (IPRC) 170A or IPRC 170B. Furthermore, when a write operation directed to an MDS or an LVDP is to be performed in response to a command, a representation of the write may first be stored in an operations journal, such as operations journal (OJ) 174A or OJ 174B. The OJs may be considered the equivalents of high-performance write buffers. Writes to the OJ may be applied sequentially in at least some embodiments, and hence may complete faster than writes that have to be applied at arbitrary offsets within a storage device. Two replicas of a given OJ may be maintained in at least some embodiments—e.g., one replica at an SS designated as the primary SS for a given LVDP, and another replica at a different SS designated as a non-primary for that same LVDP. In FIG. 1, non-primary SSs are not shown; SS 105A is a primary SS for LVDP 176A, while SS 105B is a primary SS for LVDP 176B. As soon as a respective entry representing a write operation which has been approved (using the relevant PRR, which may have been read from the IPRC) is stored in at least two replicas of an OJ, a response indicating that the corresponding command has succeeded may be transmitted to the submitter of the command (e.g., the compute instance at which the command originated) from the SS in the depicted embodiment. The use of the cache and the OJs may both help to reduce latencies for I/O commands in the depicted embodiment.

As indicated above, many worker threads may in general be responding to respective commands concurrently at a given SS at which a cached version of a PRR is maintained in main memory, and some of the commands may be modifying the PRRs themselves. In order to ensure coherency and consistency of the contents of IPRC, while still supporting desired levels of performance for I/O commands, a locking algorithm which utilizes at least two locks for a given PRR may be employed in some embodiments. One of the locks, referred to as a PRR state change-sequencing lock (CSL), may be acquired only in exclusive mode, i.e., by no more than one worker thread at a time. A second lock, referred to as a reading-writing lock (RWL), may be acquired in shared mode by one or more worker threads concurrently, or in exclusive mode by no more than one worker thread at a time. The CSL may be used to ensure that changes to the contents of a PRR are serialized relative to one another, e.g., by being applied in the order in which the corresponding PRR modification commands are received at the SS. The RWL may be used (when acquired in shared mode) to read the contents of the currently-cached version of a PRR, and (when acquired in exclusive mode) to update the cache with a new version of the PRR.

When a request to modify a PRR (of which a cached version PRRv1 is currently in the IPRC) is received at a given worker thread WT1 of an SS, WT1 may first acquire the CSL for the PRR in exclusive mode in at least some embodiments. Then, the RWL may be acquired in shared mode, the contents of PRRv1 may be read from the IPRC, and RWL may be released. A new version of the PRR, PRRv2 may be generated from the just-read version PRRv1 and the contents of the modification request, but not yet written to the IPRC. A respective entry indicating the new version PRRv2 may be stored within at least two replicas of the OJ, and a response indicating that the PRR has been successfully modified may be sent to the submitter of the modification request without waiting for the new version to be stored at the MDS in at least some embodiments. The RWL may then be acquired by WT1, this time in exclusive mode, and the IPRC version of the PRR may be modified—that is, PRRv1 may be replaced by PRRv2 while the RWL is held in exclusive mode. Finally, both the RWL and the CSL may be released by WT1. During most of these operations performed in response to a request to modify the PRR (other than the operations performed while holding the RWL in exclusive mode), other worker threads may be able to acquire the RWL in shared mode and fulfill I/O commands if PRRv1 permits them; as such, despite the fact that the PRR is being modified, I/Os being performed by other worker threads need not be delayed. Note that according to the semantics associated with PRRs, in at least some embodiments each command originating at a compute instance may be accompanied by a corresponding persistent reservation sequence number (PRSN) indicating the latest state of the PRR that is known at the compute instance at the time the command is transmitted, and the cached version of the PRR may also store the PRSN representing the latest changes applied to the PRR. The PRSNs included in the I/O commands may be compared by the worker threads to the PRSNs in the cached PRR to determine whether the I/O commands are to be accepted or rejected. The multi-lock concurrency management technique described herein may ensure that the IPRCs remain coherent and consistent in various embodiments, while also supporting very fast I/O performance.

In various embodiments, individual ones of the storage servers may have one or more commit propagators (e.g., comprising one or more processes or threads). A commit propagator may implement a "lazy" commit policy for the records stored in the operations journals—e.g., deciding, based on factors indicated in the policy (such as the extent to which free space is available in the journals, or the time that has elapsed since the oldest entry in a journal was inserted into the journal) when to propagate changes indicated in the journals to the LVDPs (for writes directed to LVDPs) or the MDS (for writes directed to metadata stored in the MDS, such as PRRs), and propagating the changes accordingly. In at least some embodiments, entries in the operations journals may each include a sequence number, and the changes may be propagated in order of the sequence numbers.

Figure 2:
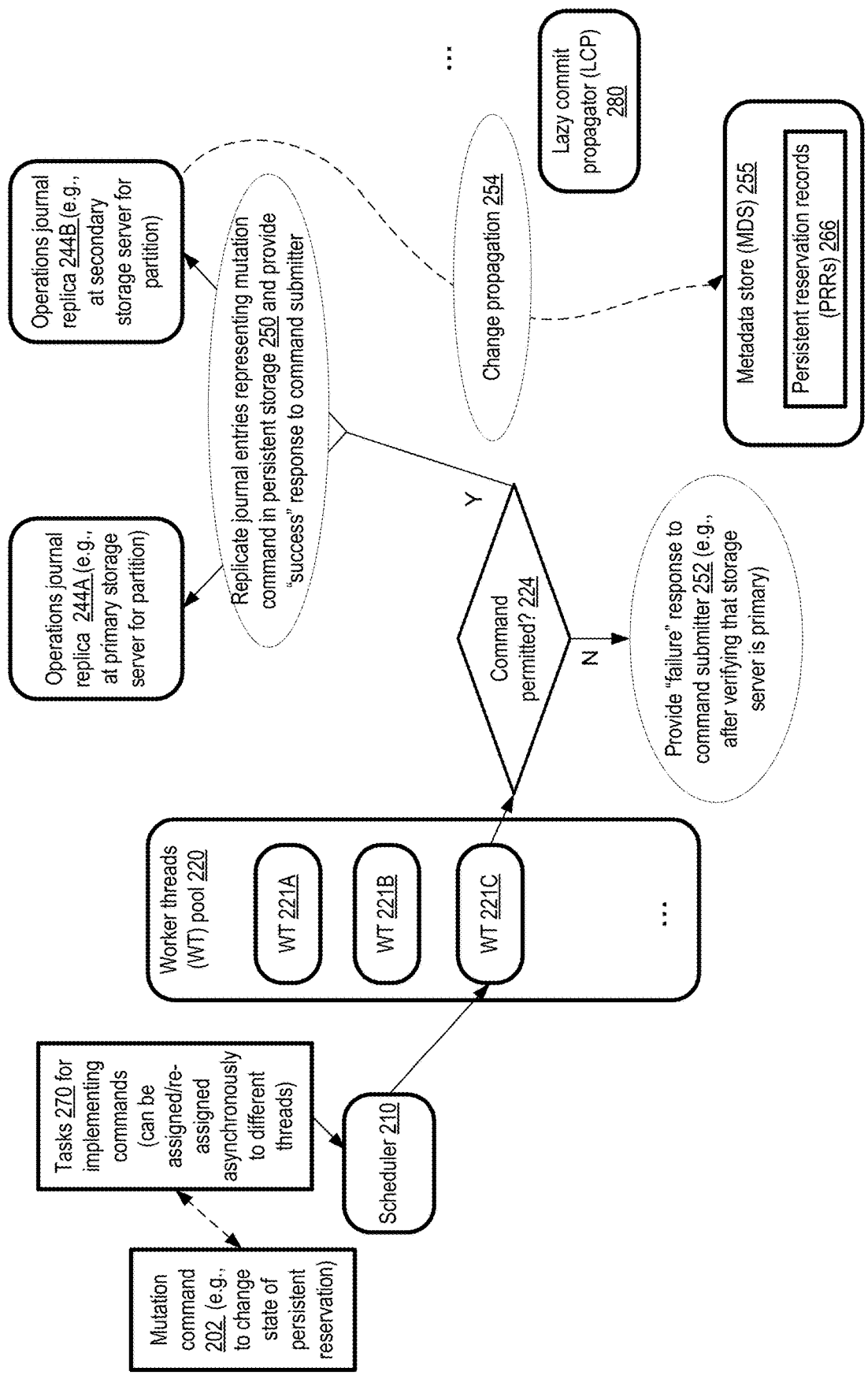
FIG. 2 illustrates an example use of a replicated operations journal to speed responses to mutation commands directed to logical volumes, according to at least some embodiments.

FIG. 2 illustrates an example use of a replicated operations journal to speed responses to mutation commands directed to logical volumes, according to at least some embodiments. In the depicted embodiment, an asynchronous task-based workload management technique may be implemented at the storage servers of a BSS. Corresponding to a given command (such as a reservation state change command, or a volume I/O command), one or more tasks 270 may be created at a BSS storage server to implement the command. These tasks may be placed in a queue, list or other similar data structure, and assigned to worker threads (WTs) of a WT pool 220 as and when WTs become available. If a particular WT WT-a cannot make progress on the task Task-k it is currently assigned, e.g., due to the need to acquire a lock of the type discussed below, WT-a may stop working on Task-k, and be assigned a different task Task-b on which it can attempt to make progress; as such, the WTs may not be blocked from performing useful work even if a lock or other resource needed for a given task is not available. If and when the condition that prevented the progress on Task-k no longer holds (e.g., if a lock becomes available), Task-k can be assigned to an available worker thread (which could be WT-a, or some other WT). A scheduler 210 (such as a task scheduler or a thread scheduler) of a storage server of a BSS similar in features and functionality to BSS 102 of FIG. 1 may assign a task 270 corresponding to a received mutation command 202 to a selected WT 221C of a WT pool 220 (which also includes WTs 221A and 221B) of the storage server in the depicted embodiment. The mutation command 202 may be directed to the data of a logical volume whose partition is stored at the storage server, or to metadata (such as a PRR) of the logical volume in various embodiments. Any of a variety of techniques may be implemented to select worker threads for assigning various commands in different embodiments. For example, in one embodiment, as soon as a WT completes or fulfills a given command, a record indicating that worker thread may be placed in an "available-threads" queue, and the WT scheduler may select WTs in the order in which the corresponding records were queued. To simplify the presentation, the terminology "a worker thread receives a command" may be used herein as the logical equivalent of "a worker thread is assigned a task which was created to fulfill a command". Assignment of a task corresponding to a command to a given worker thread in effect notifies or informs the worker thread of the operations that are to be completed by the worker thread (if needed resources such as locks are available) to fulfill the command in various embodiments. Note that the WTs of pool 220 may be logical threads managed by the BSS, implemented at a higher level of abstraction than operating system threads in at least some embodiments.

WT 221C may determine, e.g., using the current version of the PRR, whether the command is permitted or not in the depicted embodiment. If the command is not permitted (as determined in operations corresponding to element 224), a "failure" response may be provided to the submitter of the command, as indicated in element 252. Further details regarding the circumstances in which commands may be rejected in different embodiments are provided below—for example, in some embodiments, a persistent reservation abort sequence number (PRSN_Abort) stored in the PRR may be used, along with other elements of the PRR such as read and write permissions for various compute instances. In at least some embodiments, as indicated above, at least a pair of storage servers may be used for storing respective replicas of a given partition of a logical volume at a BSS—one primary storage server and at least one non-primary storage server. Over time, e.g., due to failures or maintenance events, a storage server which is currently not a primary may be made the primary for a given partition, and the status of the earlier primary storage server may be changed to non-primary. In at least some embodiments, a primary-status-change sequence number may be incremented each time the roles of the storage servers change in this way. In various embodiments, before sending a failure response to a command submitter, a storage server may verify, using a protocol based on such primary-status-change sequence numbers, that it (the storage server) is currently the primary for the partition with which the command is associated.

If WT 221C determines that the operation(s) indicated in the command are permitted, respective journal entries representing the mutation command may be replicated in at least two replicas of an operations journal in the depicted embodiment (element 250). One copy of the entry may be stored in operations journal replica 244A, while another copy may be stored in operations journal replica 244B. In some embodiments, one operations journal copy may be stored at the primary storage server for a logical volume partition, and a second copy may be stored at a non-primary or secondary storage server for the partition. In at least some embodiments, an operations journal associated with a logical volume may be stored at a different storage device of a given storage server (either a primary or a non-primary storage server) than the storage device which is used for storing the logical volume data at the storage server. A success response, indicating that the mutation command 202 has succeeded, may be sent to the submitter of the command as soon as the entries have been replicated at multiple operations journals in the depicted embodiment.

In the depicted embodiment, if the mutation command includes a change to the logical volume's metadata such as a PRR 266, a lazy commit propagator 280 of the storage server may eventually update the metadata within the MDS 255 (as indicated in element 254) using the information included in the operations journal entries. If the mutation command were instead directed to the data of the logical volume, the commit may propagate the changes to the storage devices at which the data is stored. Because the responses indicating successful mutation are provided as soon as the journal entries are replicated, and such journal entries may be replicated very quickly, the response time experienced by the submitter of the mutation command may be kept low in various embodiments.

FIG. 3 illustrates examples of persistent reservation types which may be supported for client compute instances accessing logical volumes of a block storage service, according to at least some embodiments. The reservation types and associated entities (e.g., reservation holders, registrants, and non-registrants) and semantics (i.e., the kinds of operations that can be performed by a holder, registrant or non-registrant) shown in Table 300 of FIG. 3 are defined in the NVMe 1.4 specification. In the specification, six types of reservations for NVMe-based storage devices are defined as shown in the table: Write Exclusive, Exclusive Access, Write Exclusive—Registrants Only, Exclusive Access—Registrants Only, Write Exclusive—All Registrants, and Exclusive Access—All Registrants. The number of reservation holders, and the types of operations permitted (with Y indicating permitted operations, and N indicating prohibited operations) in each reservation type, are indicated in Table 300.

In various embodiments, reservation types similar (but not necessarily identical) to those shown in FIG. 3 may be supported for logical volumes (or for individual partitions of logical volumes) by a BSS similar in features and functionality to BSS 102 of FIG. 1. Such support may be provided regardless of the type of storage devices on which the data of the logical volumes is stored—e.g., the support for reservations may not necessarily be tied to the storage technology used at the BSS. The reservation holders, registrants and non-registrants may be compute instances that are programmatically attached to the logical volumes in at least some embodiments. The reservation type that is used for a given logical volume may be selected based on invocations of BSS APIs from the compute instances, and/or based on input received via programmatic interfaces at the BSS control plane from administrators of the logical volumes or compute instances.

Figure 4:
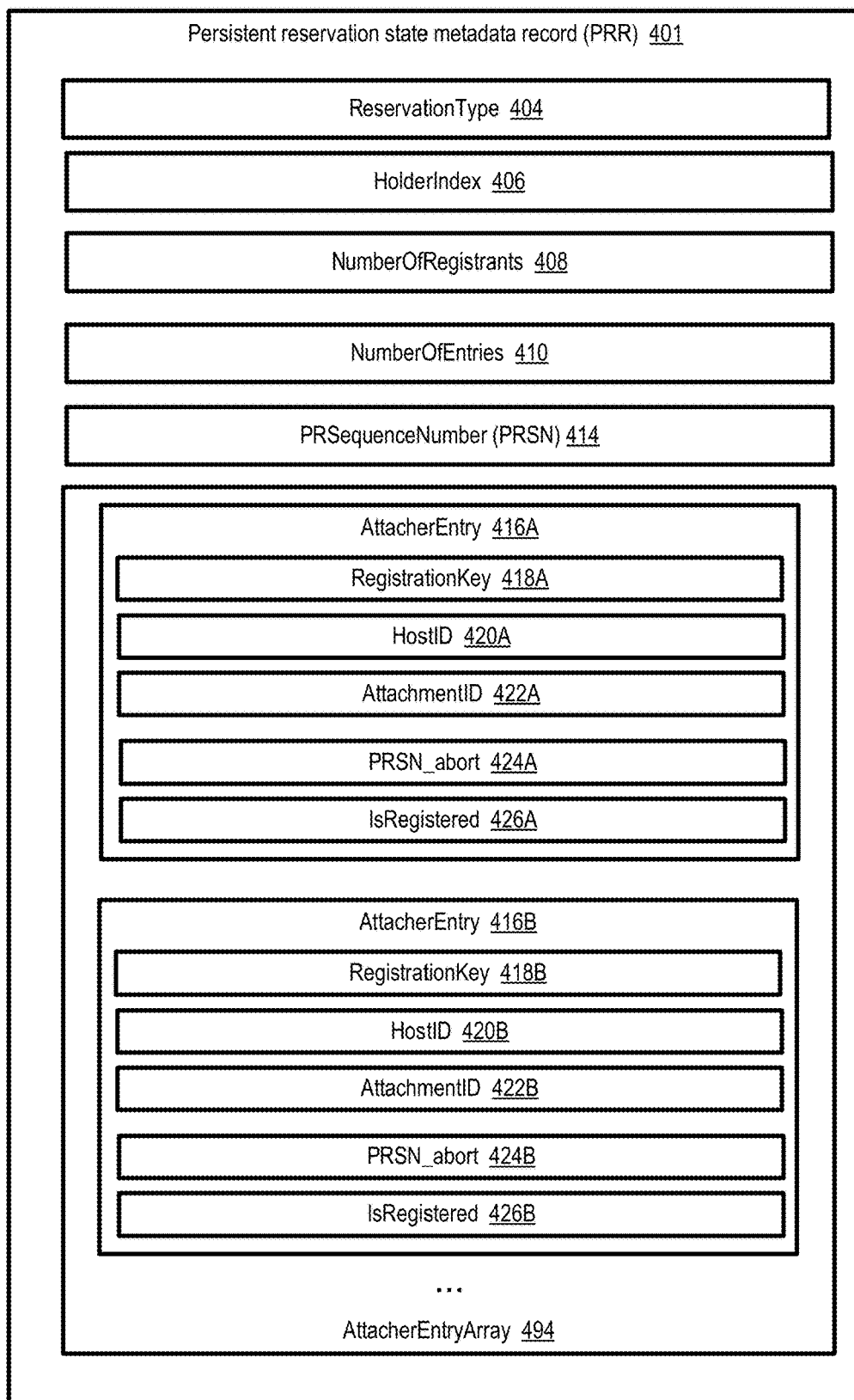
FIG. 4 illustrates example contents of persistent reservation state metadata records which may be maintained at a block storage service, according to at least some embodiments.

FIG. 4 illustrates example contents of persistent reservation state metadata records which may be maintained at a block storage service, according to at least some embodiments. In the depicted embodiment, for a given logical volume of the BSS, a persistent reservation state metadata record (PRR) 401 may include a ReservationType field 404 indicating the type of reservation (e.g., one of the reservation types shown in FIG. 3) that is being used. At a given point in time, there may be zero or more compute instances that are programmatically attached to the logical volume, and the PRR may include an AttacherEntryArray 494 with respective entries (such as AttacherEntry 416A, AttacherEntry 416B, etc.) representing the attached compute instances.

If the reservation type being used requires a single reservation holder to be specified, the HolderIndex field 406 may be used to indicate the index of the reservation holder compute instance within the AttacherEntryArray in the depicted embodiment. Not all the attached compute instances may have been registered (e.g., via invocation of registration APIs) with respect to the reservation for a given logical volume in some embodiments; the NumberOfRegistrants field 408 may indicate how many of the attached compute instances are registered. The NumberOfEntries 410 may indicate the total number of compute instances that are currently attached. A monotonically increasing integer referred to as a PRSequenceNumber (PRSN) may be incremented each time the PRR is updated (e.g., at the particular storage server which is currently designated as the coordinator for changes to the PRR of the logical volume) in the depicted embodiment. An attached compute instance may store a PRSN indicating the most recent PRR updates of which the compute instance is aware in various embodiments, and include that PRSN within I/O commands sent to the storage servers at which the partitions of the logical volume are stored. If a compute instance is informed (e.g., by a storage server to which an I/O request is sent from the compute instance) that the PRSN known at the compute instance is stale (i.e., that a newer PRSN value has been set by the coordinator storage server), the compute instance may communicate with the coordinator storage server to obtain the latest version of the PRR and the corresponding PRSN in various embodiments.

A given entry 416 in the AttacherEntryArray 494 may store various metadata elements pertaining to an attached compute instance. These elements may include a unique key (e.g., RegistrationKey 418A or 418B) supplied on behalf of the compute instance to the BSS at the time that a request or command to register the compute instance is submitted, an identifier chosen as a host identifier for the compute instance (e.g., HostID 420A or 420B), an identifier of the attachment (e.g., AttachmentID 422A or 422B), and a Boolean value (e.g., IsRegistered 426A or 426B) indicating whether the compute instance represented by the entry is currently registered or not with respect to the logical volume. The HostID fields may be used in some embodiments to comply with storage standards (such as various NVMe standards) which require such terminology for identifying sources of I/O commands and reservation-related commands; however, the HostID fields in the AttacherEntry fields need not necessarily be related to identifiers of virtualization hosts at which the corresponding attached compute instances run. In some implementations, a HostID field may serve in effect as an identifier (which may be selected at the corresponding attached compute instance) of the compute instance rather than as an identifier of a virtualization host. In at least some embodiments, an integer referred to as PRSN_abort (e.g., PRSN_abort 424A or PRSN_abort 424B) may also be stored for each attached compute instance. The PRSN_abort field may be used to implement compute instance access abort functionality. The value of PRSN_abort for a given compute instance may indicate a PRSN value after which the permissions granted to the compute instance are revoked. For example, if the PRSN_abort for a given compute instance CI1 is set to Y, this may be interpreted at a storage server SS1 of the BSS to mean that any I/Os directed from CI1 to the logical volume partition LVDP1 hosted at SS1 are to be aborted if the PRSN stored at SS1 is greater than Y. In some embodiments, SS1 may drain in-flight I/Os for LVDP1 prior to committing a PRR change that includes a change to PRSN_abort.

In various embodiments, some of the fields of a PRR 401 may be modifiable based on commands issued from compute instances or administrators, while others may in some cases not be modifiable. For example, among other fields, the number of entries in the AttacherEntryArray may be changed, the HolderIndex may be changed, the NumberOfRegistrants may be changed, the ReservationType may be changed, and so on. In at least one embodiment, a PRR 401 may also indicate which, if any, of the attached compute instances is permitted to mutate the PRR itself. Information about permission to mutate the PRR may be indicated within the attacher entries in one implementation, and may be encoded within the ReservationType field 404 in other implementations. In some embodiments, if an attached compute instance is permitted to write to a logical volume partition based on the reservation type, that compute instance may also be permitted to update the PRR.

Figure 5:
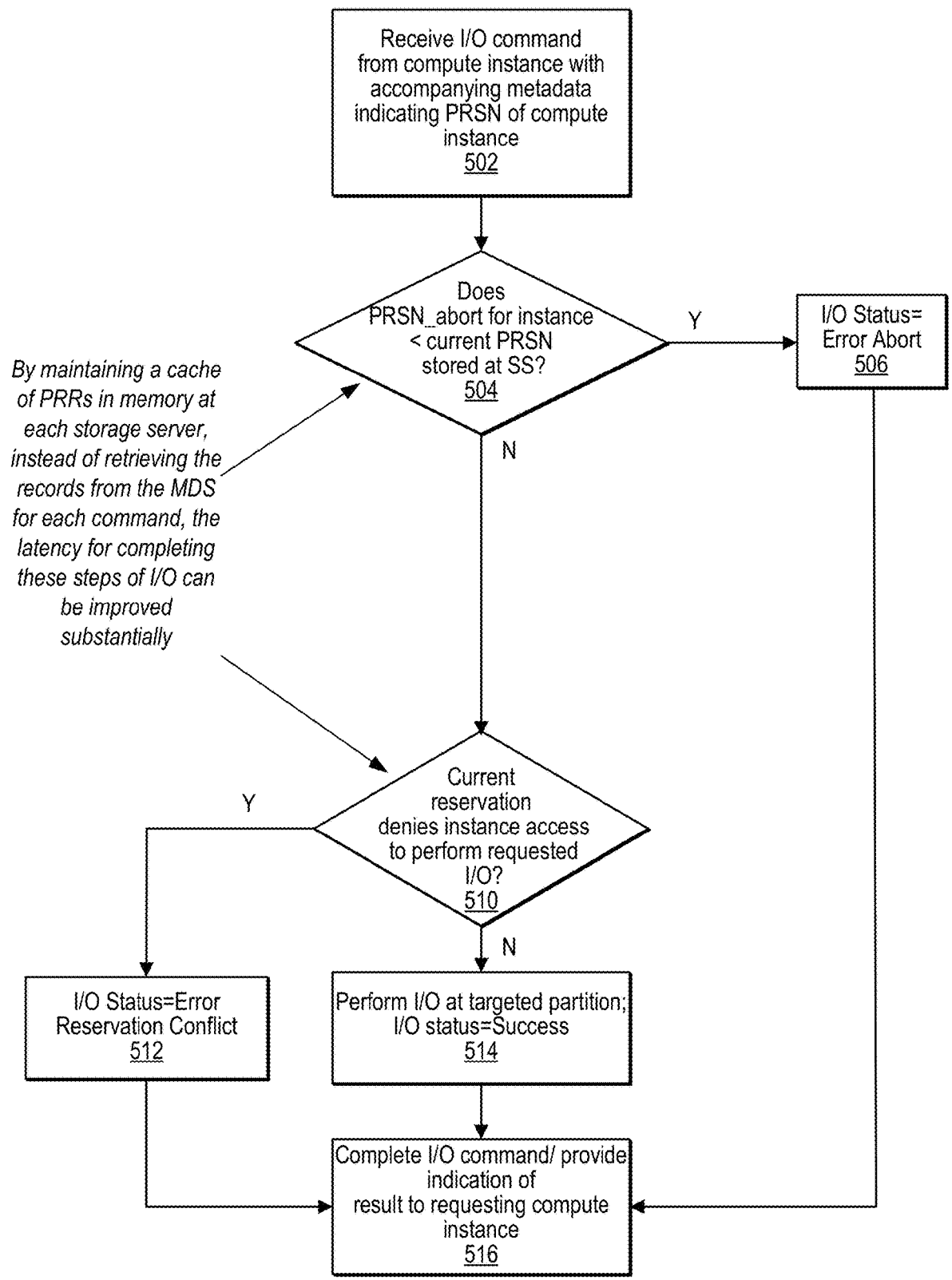
FIG. 5 illustrates an overview of processing of an I/O command at a storage server of a block storage server at which persistent reservations are supported, according to at least some embodiments.

FIG. 5 illustrates an overview of processing of an I/O command at a storage server of a block storage server at which persistent reservations are supported, according to at least some embodiments. To simplify the presentation, the processing operations shown in FIG. 5 assume that the I/O command can be fulfilled by a single storage server at which a particular partition of a logical volume is stored; that is, that the command does not span partition boundaries. A single I/O can span partitions if some of the data read or written belongs to one partition, and other portions of the data read or written belong to another partition. Such partition-boundary-spanning I/Os are referred to as split I/Os; split I/Os are handled in a slightly different way than single-partition I/Os—e.g., a special split-I/O flag may be set in the command, and PRR permissions need only be checked at one of the storage servers involved.

As shown in element 502, an I/O command targeted to a given partition LVDP1 of a logical volume may be received at a storage server with accompanying metadata indicating the PRSN of the compute instance from which the command is submitted. The contents of the PRR stored at the storage server may be accessed (e.g., by a worker thread). If a determination is made, based on the PRR, that the PRSN_abort value for the compute instance is less than the current PRSN stored at the storage server, as determined in operations corresponding to element 504, the status of the I/O command response may be set to Error Abort in the depicted embodiment, as shown in element 506.

If the PRR indicates that the PRSN_abort for the compute instance is not less than the current PRSN, as also determined in operations corresponding to element 504, a determination may be made as to whether the current reservation state denies the compute instance access to perform the requested I/O (element 510). If the permissions indicated in the PRR prohibit the I/O requested, the I/O status may be set to Error Reservation Conflict (element 512) in the depicted embodiment. If the I/Os are permitted, the requested I/Os may be performed at the targeted partition (element 514). Note that performing the I/O may involve adding entries to operations journal in some embodiments as discussed above. The I/O command may then be considered complete, and an indication of the result may be sent to the requesting compute instance (element 516).

As mentioned earlier, in some embodiments applications run at the compute instances may require extremely fast response times for their I/O commands. If the PRR has to be read in from the metadata store for the operations indicated in elements 504 or 510, this can take more time than desired. According, a cache comprising the PRR may be maintained in main memory of the storage server to reduce the overall response time. By maintaining such a cache, the average latency for completing I/Os can be improved substantially. Of course, since the PRRs may have to be updated from time to time, and multiple worker threads may need to access the PRRs concurrently or near-concurrently at the storage server, the cached PRRs may have to be protected using locks as described below.

Figure 6:
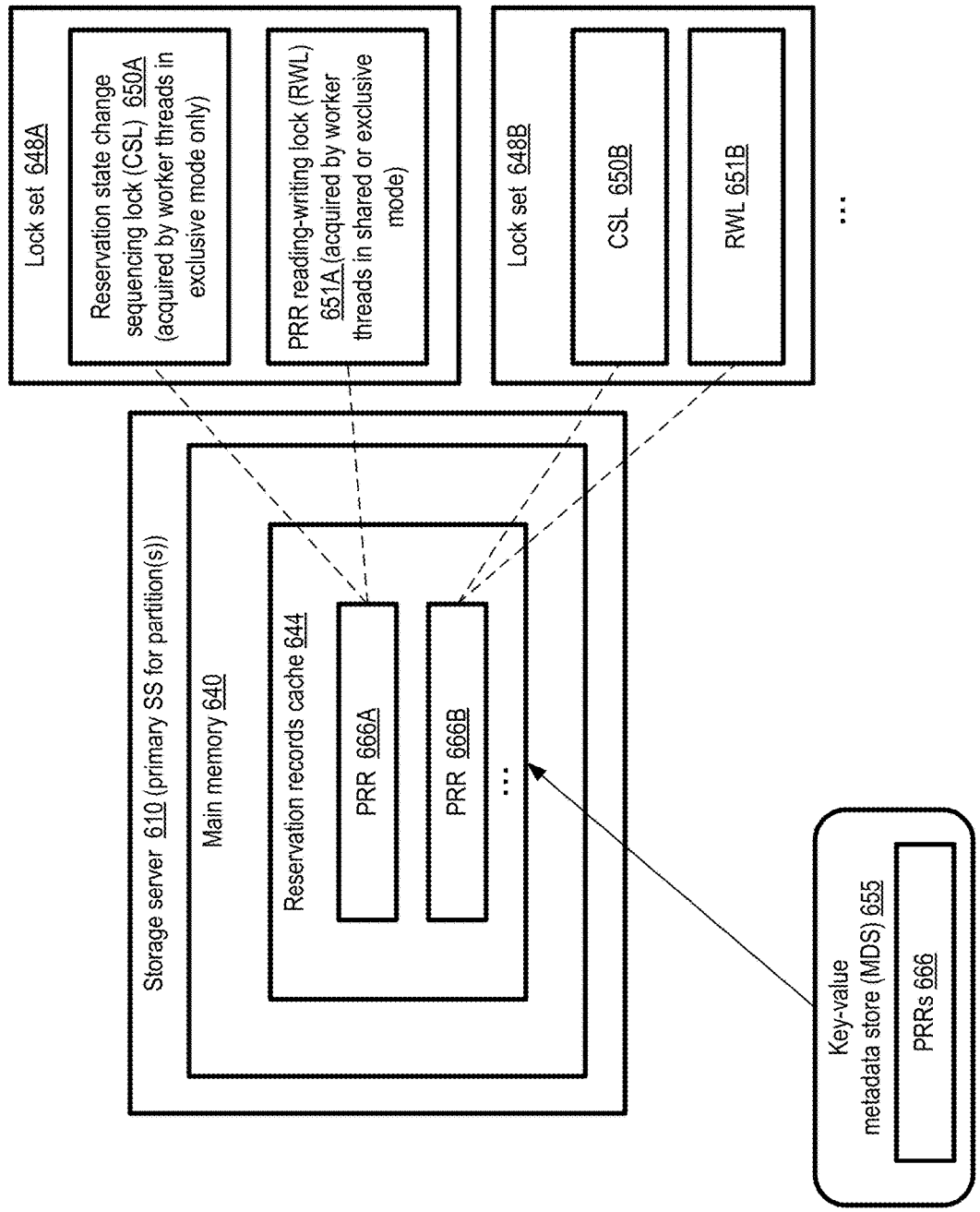
FIG. 6 illustrates examples of lock sets, comprising reservation state-change-sequencing locks and reading-writing locks, which may be employed at a block storage service to help reduce latencies for I/O operations, according to at least some embodiments.

FIG. 6 illustrates examples of lock sets, comprising reservation state change-sequencing locks and reading-writing locks, which may be employed at a block storage service to help reduce latencies for I/O operations, according to at least some embodiments. In the embodiment depicted in FIG. 6, a reservation records cache 644 may be established in the main memory 640 of a partition's primary storage server 610 (the storage server at which a primary copy of a logical volume partition is stored in embodiments in which each partition is stored at multiple storage servers to enhance fault tolerance and availability). As discussed below in further detail, the cache may be initialized and populated at the time that the storage server is brought online, or when a non-primary storage server is designated as the new primary storage server due to an event such as a failure of the prior primary storage server. In some embodiments, only one partition of one logical volume may be stored at a given storage server, so only one PRR may need to be cached. In the embodiment depicted in FIG. 6, respective partitions of multiple logical volumes may be stored at a given storage server, and that storage server may be designated as the primary storage server for one or more of the partitions of the different logical volumes.

Corresponding to each of the logical volumes for whose partition the storage server is designated as the primary storage server, a copy of a PRR may be obtained from a set of PRRs 666 stored within a key-value metadata store 655 in the depicted embodiment and placed in the cache 644. In addition to storing the PRRs in memory, a respective lock set (such as lock set 648A and lock set 648B) may be initialized for each PRR in the depicted embodiment for managing concurrent accesses to the PRRs efficiently. A given lock set may comprise a reservation state change sequencing lock (CSL) (such as CSL 650A for PRR 666A, and CSL 650B for PRR 666B) and a PRR reading-writing lock (RWL) (such as RWL 651A for PRR 666A, and RWL 651B for PRR 666B). The CSLs, which may only be acquired in exclusive mode by worker threads at the storage server) may be used to ensure that the corresponding PRRs are updated in sequential order, such that no two updates to a given PRR can interfere with each other. The RWLs may be acquired in either shared mode (i.e., so that multiple worker threads can read the PRR concurrently or near-concurrently) or exclusive mode (to ensure that the PRR cannot be read by any worker thread while it is in the process of being modified). Further details of the manner in which the lock sets may be used in response to commands to modify PRRs and/or in response to I/O commands from compute instances are provided below. Note that in at least some embodiments in which the asynchronous task-based technique discussed in the context of FIG. 2 is used for managing BSS commands, a given BSS storage server worker thread which requires a CSL or a RWL in an exclusive mode may not have to wait (without doing any useful work) if the lock is currently unavailable. Instead, the thread may simply stop working on the task or command which requires the lock, and start working on a different command or thread (if such a command or thread is available, based on the current workload level). In various embodiments, if/when a CSL or an RWL cannot be obtained in the desired mode (e.g., exclusive mode) this does not require the processor (on which the thread which was attempting to acquire the lock runs) to spin on the lock.

Figure 7A:
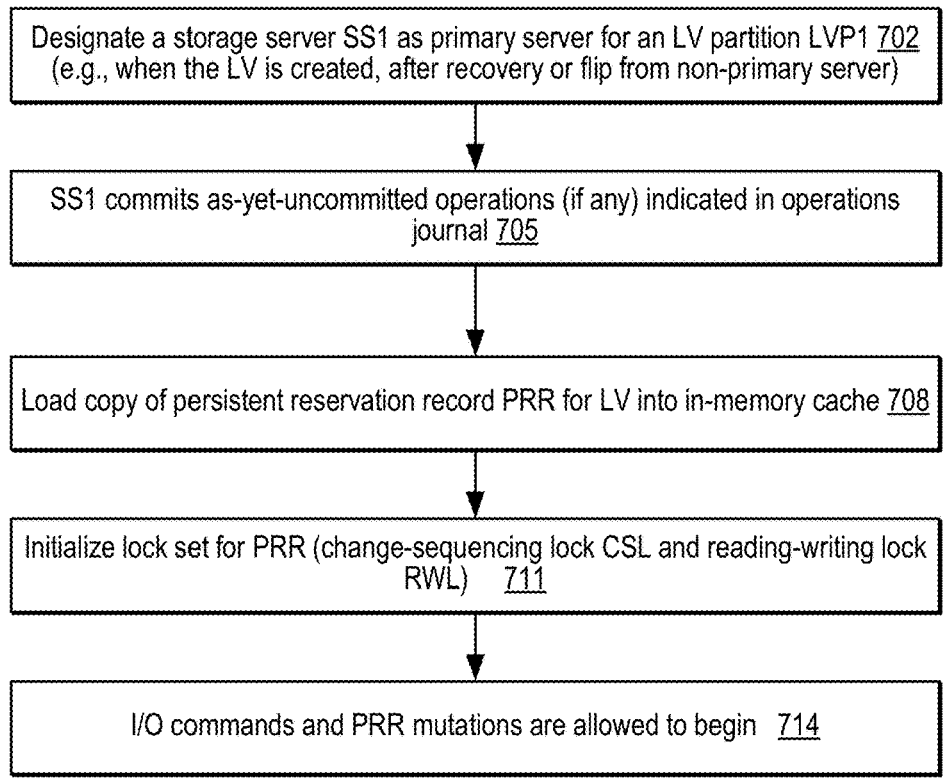
FIG. 7A is a flow diagram illustrating aspects of operations associated with initializing an in-memory cache for a reservation record at a storage server of a block storage service, according to at least some embodiments.

FIG. 7A is a flow diagram illustrating aspects of operations associated with initializing an in-memory cache for a reservation record at a storage server of a block storage service, according to at least some embodiments. As shown in element 702, a storage server SS1 may be designated as a primary server for a logical volume partition LVP1, e.g., by control-plane components of a BSS similar to BSS 102 of FIG. 1. SS1 may be designated as a primary when, for example, the logical volume is created, after a recovery from a failure or a change of status of a non-primary storage server to the primary storage server. In at least some embodiments, SS1 may comprise one or more threads or processes designated as a transition-to-primary-status manager, and at least some of the operations shown in FIG. 7A may be performed by such a transition-to-primary-status manager.

Upon being designated as the primary server, SS1 may commit as-yet-uncommitted operations (if any) that are indicated by entries that were placed earlier in an operations journal of the kind introduced in FIG. 1 (element 705). A copy of the persistent reservation record (PRR) for LV may be loaded into a newly-created in-memory cache at the primary server in various embodiments (element 708). Note that such a cache may not be set up at a non-primary server in at least some embodiments, as the non-primary server is not used to handle I/O commands which would benefit from the use of a cache.

A lock set comprising a CSL and an RWL for the PRR may be created and initialized in the depicted embodiment (element 711). After the locks have been set up, I/O commands and PRR mutations may be allowed to begin at the primary server (element 714).

Figure 7B:
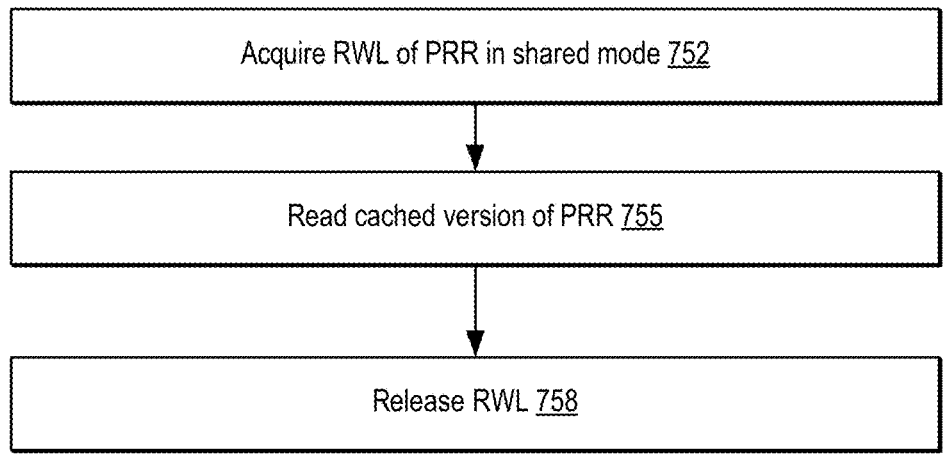
FIG. 7B is a flow diagram illustrating aspects of operations associated with accessing a cached version of a reservation record at a storage server of a block storage service, according to at least some embodiments.

In order to determine whether an I/O command directed to a partition of a logical volume can be accepted, the PRR for the logical volume may have to be read by the worker thread assigned the task of processing the I/O command. FIG. 7B is a flow diagram illustrating aspects of operations associated with accessing a cached version of a reservation record at a storage server of a block storage service, according to at least some embodiments. As shown in element 752, the reading-writing lock RWL of the cached PRR may be acquired in shared mode by the worker thread. If the RWL is currently held in exclusive mode by another worker thread, progress on a command (such as a read) which requires the RWL to be held in shared mode may be deferred until the exclusive mode lock is released. After the RWL is acquired in shared mode, the cached version of the PRR may be read (element 755). The RWL may then be released by the worker thread in various embodiments (element 758).

Figure 8:
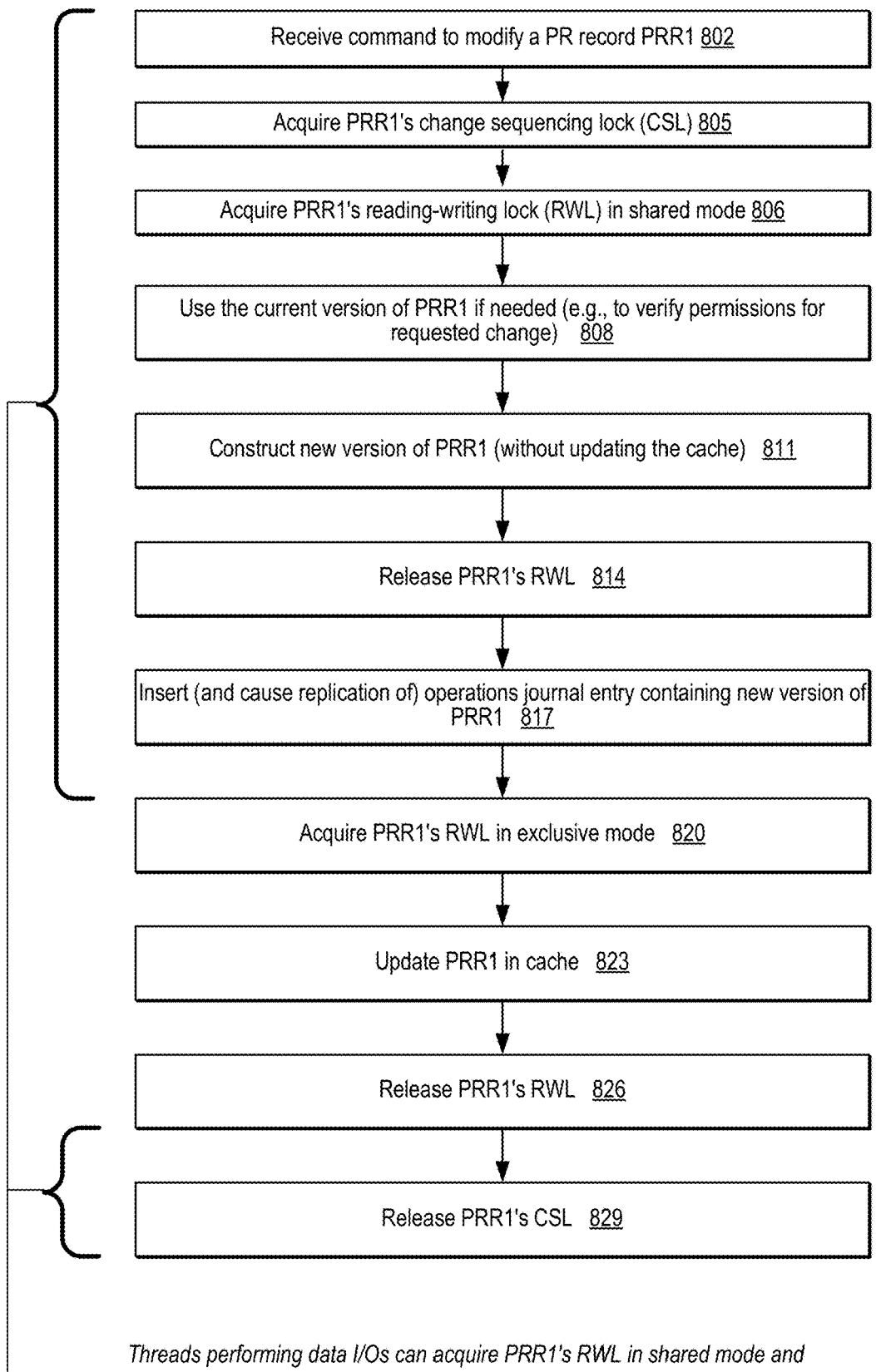
FIG. 8 is a flow diagram illustrating aspects of operations associated with mutating a reservation record at a storage server of a block storage service, according to at least some embodiments.

FIG. 8 is a flow diagram illustrating aspects of operations associated with mutating a reservation record at a storage server of a block storage service, according to at least some embodiments. A command to modify or mutate a PRR PRR1 may be received at a storage server, e.g., from a compute instance (element 802) or from an administrator. A worker thread WT1 may determine that the command has been received—for example, a task created based on the command may be assigned to WT1. The worker thread may acquire the CSL for PPR1 (element 805). In various embodiments, the CSL, which is used to ensuring that changes to PRRs are applied in a serial order, may only be acquired in exclusive mode; as such, if the CSL is currently held by another worker thread, WT1 may not be able to acquire it. Note that in FIG. 8 WT1 is assumed to be able to acquire the locks it needs as it works on the PRR modification command; scenarios in which WT1 is unable to acquire locks may be handled in the manner discussed in FIG. 2—e.g., by pausing the execution of a task associated with the PRR modification, but allowing WT1 to make progress on other tasks if such tasks are available.

If WT1 is able to acquire the CSL, PRR1's RWL may then be acquired by WT1 in shared mode (element 806) in the depicted embodiment. The currently cached version of PRR1 may then be read by WT1. This read of PRR1 may be performed at this stage for any of several reasons. In some cases, PRR1 may indicate whether the entity that is requesting the change to PRR1 is permitted to make the change or not, so the current version of PRR1 may be used to verify permissions for the requested change (element 808). If the requested change is not permitted, the command may be rejected at this stage. If the requested change is permitted, in some cases the new version of PRR1 may have to be constructed by applying one or more changes to the existing version of PRR1. The new version of PRR1 may be constructed (element 811), e.g., in a portion of memory accessible to WT1, but may not yet be written to the cache in the depicted embodiment. The RWL which was being held in shared mode may then be released (element 814). Note that in some embodiments, the RWL may be released as soon as the existing cached version of PRR1 is read, and before the new version is constructed.

An entry indicating or containing the new version of PRR1 may be created and inserted into at least two replicas of the operations journal in the depicted embodiment (element 817). In embodiments in which the journal replicas are maintained at different storage servers, the replication of the entry may require network communication between the storage servers.

After WT1 has verified that the journal entries have been replicated, WT1 may acquire PRR1's RWL, this time in exclusive mode (element 820). If other threads happen to be holding the RWL in shared mode or in exclusive mode, progress on the PRR modification command being processed may have to be deferred until the RWL is released. After the RWL is acquired in exclusive mode, PRR1's cached version may be updated to the new version (element 823), and the RWL may be released (element 826). Finally, the CSL which was being held in exclusive mode may also be released (element 829).

The locking design introduced herein for managing concurrent accesses to PRRs has the benefit that during most of the operations illustrated in FIG. 8 (as indicated by the curly brackets on the left), threads performing data I/Os to the partition for which PRR1 is maintained can acquire the RWL of PRR1 in shared mode (and decide whether their data I/Os are permitted or not), despite the fact that an update of PRR1 is underway. As a result of the locking scheme and the use of the in-memory cache, the performance impact of PRR mutations on data I/Os may be reduced or minimized, enabling very low latencies for I/O commands to be achieved on average.

Figure 9:
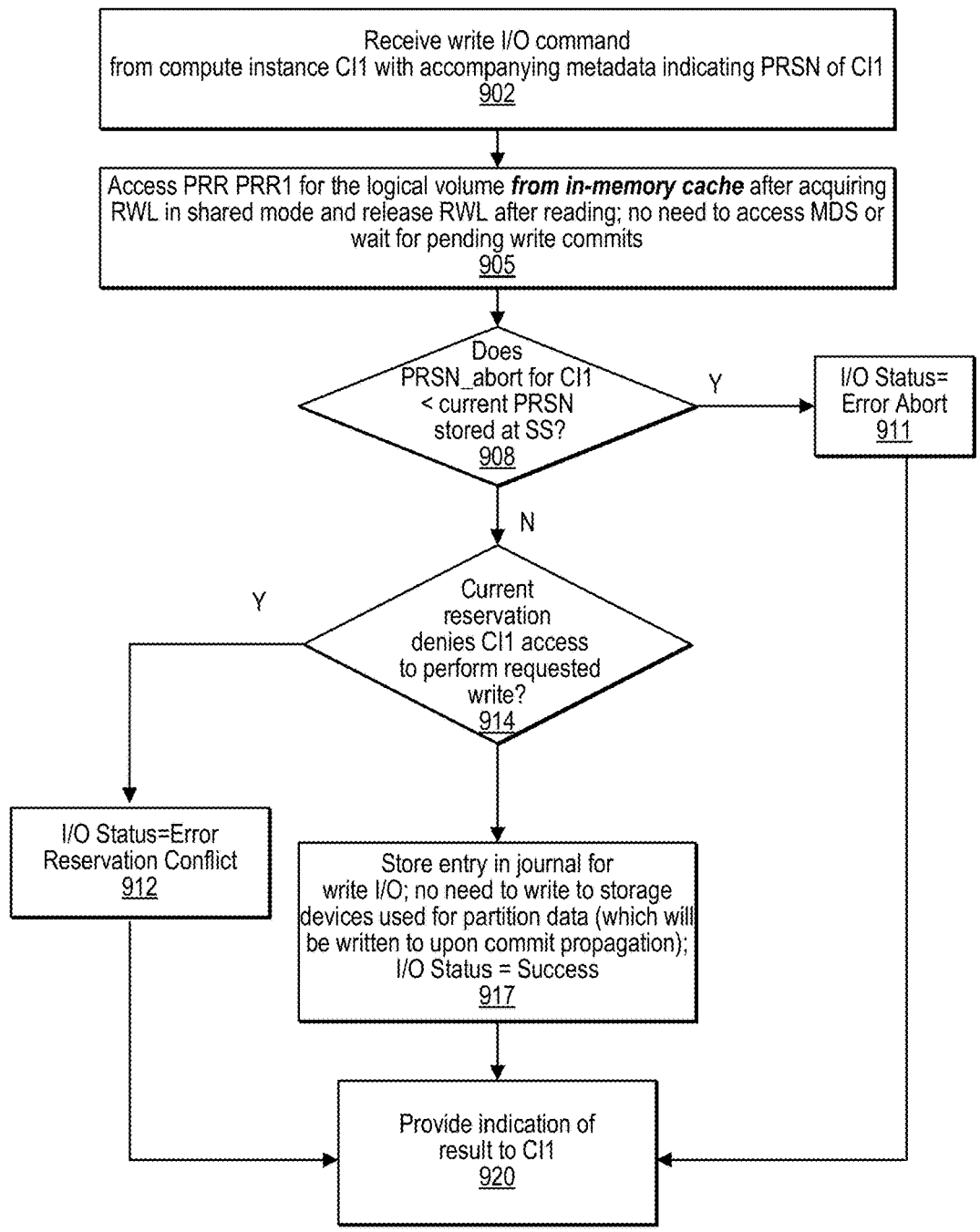
FIG. 9 is a flow diagram illustrating aspects of operations associated with processing a write I/O command directed to a logical volume at a storage server of a block storage service, according to at least some embodiments.

FIG. 9 is a flow diagram illustrating aspects of operations associated with processing a write I/O command directed to a logical volume at a storage server of a block storage service, according to at least some embodiments. As shown in element 902, a write I/O command may be received from a compute instance CI1 at a storage server at which a primary version of a partition of a logical volume is stored, with accompanying metadata indicating the PRSN currently known or stored at CI1. A PRR PRR1 for the targeted logical volume may be accessed or read from an in-memory cache after acquiring the RWL for PRR1 in shared mode (element 905). After the contents of PRR1 are read, the RWL may be released, and there may be no need to access the persistent metadata store at which the authoritative or committed version of PRR1 is stored, or wait for any pending commits of writes directed to PRR1.

If a determination is made, based on PRR1 read from the cache, that the PRSN_abort value for CI1 is less than the current PRSN stored at the storage server, as determined in operations corresponding to element 908, the status of the I/O command response may be set to Error Abort in the depicted embodiment, as shown in element 911.

If PRR1 indicates that the PRSN_abort for the compute instance is not less than the current PRSN, as also determined in operations corresponding to element 908, a determination may be made as to whether the current reservation state denies the compute instance access to perform the requested write I/O (element 914). If the permissions indicated in PRR1 prohibit the write requested, the I/O status may be set to Error Reservation Conflict (element 912) in the depicted embodiment.

If the I/Os are permitted, respective entries indicating the requested write operation (e.g., the value resulting from the write) may be stored in one or more replicas of an operations journal (element 917), and the I/O status may be set to Success in the depicted embodiment. There may be no need to write to the storage devices that are used for the targeted partition's data; those writes may be performed later, during commit propagation. The I/O command may then be considered complete, and an indication of the result may be sent to the requesting compute instance CI1 (element 920).

Figure 10:
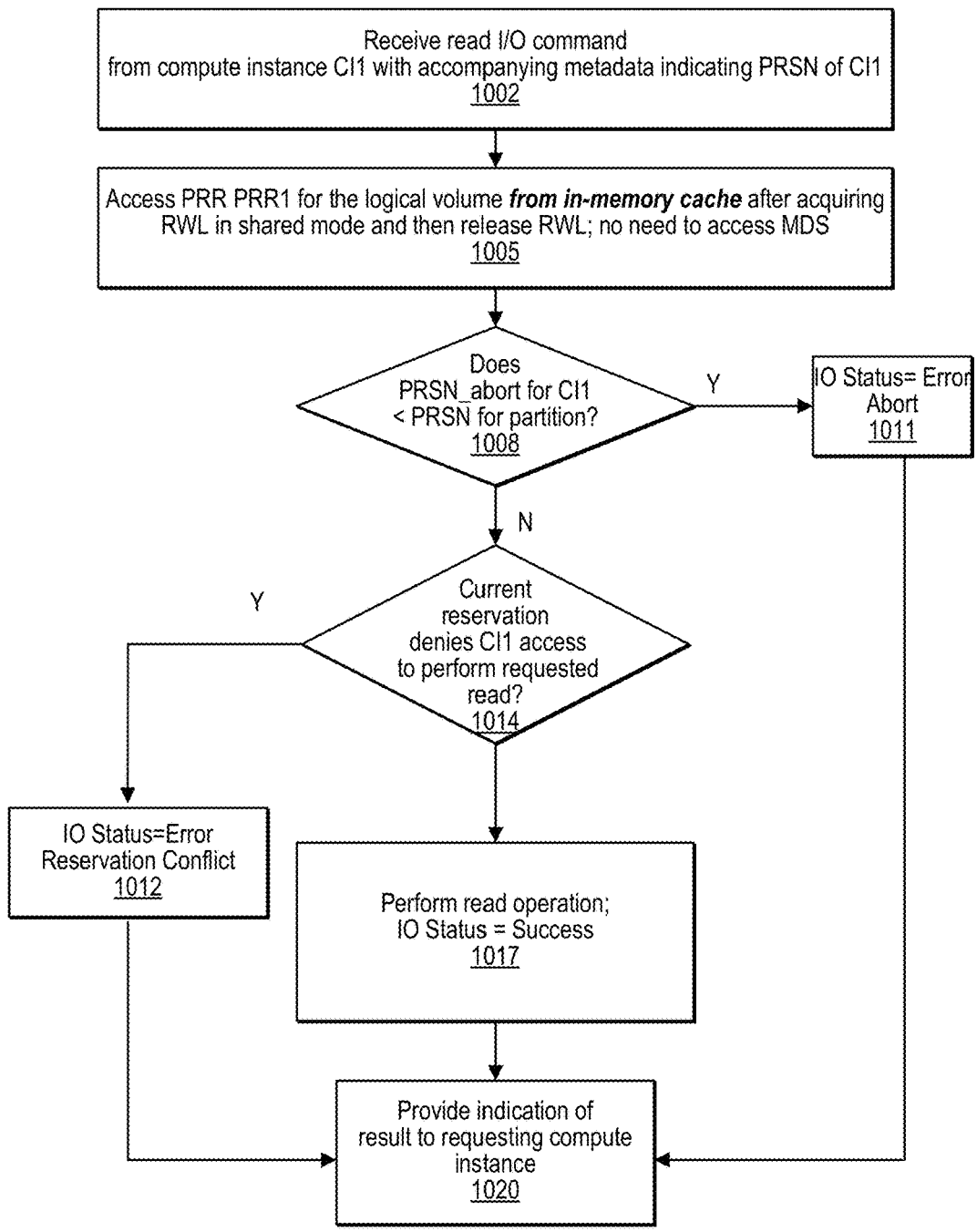
FIG. 10 is a flow diagram illustrating aspects of operations associated with processing a read I/O command directed to a logical volume at a storage server of a block storage service, according to at least some embodiments.

FIG. 10 is a flow diagram illustrating aspects of operations associated with processing a read I/O command directed to a logical volume at a storage server of a block storage service, according to at least some embodiments. As shown in element 1002, a read I/O command may be received from a compute instance CI1 at a storage server at which a primary version of a targeted partition of a logical volume is stored, with accompanying metadata indicating the PRSN currently known or stored at CI1. A PRR PRR1 for the targeted logical volume may be accessed or read from an in-memory cache after acquiring the RWL for PRR1 in shared mode (element 1005). After the contents of PRR1 are read, the RWL may be released, and there may be no need to access the persistent metadata store at which the authoritative or committed version of PRR1 is stored, or wait for any pending commits of writes directed to PRR1.

If a determination is made, based on PRR1 read from the cache, that the PRSN_abort value for CI1 is less than the current PRSN stored at the storage server, as determined in operations corresponding to element 1008, the status of the read I/O command response may be set to Error Abort in the depicted embodiment, as shown in element 1011.

If PRR1 indicates that the PRSN_abort for the compute instance is not less than the current PRSN, as also determined in operations corresponding to element 1008, a determination may be made as to whether the current reservation state denies the compute instance access to perform the requested read I/O (element 1014). If the permissions indicated in PRR1 prohibit the read requested, the I/O status may be set to Error Reservation Conflict (element 1012) in the depicted embodiment.

If the read I/O is permitted, the read I/O may be performed, and the I/O status may be set to Success in the depicted embodiment (element 1017). The I/O command may then be considered complete, and an indication of the result may be sent to the requesting compute instance CI1 (element 1020).

Figure 11:
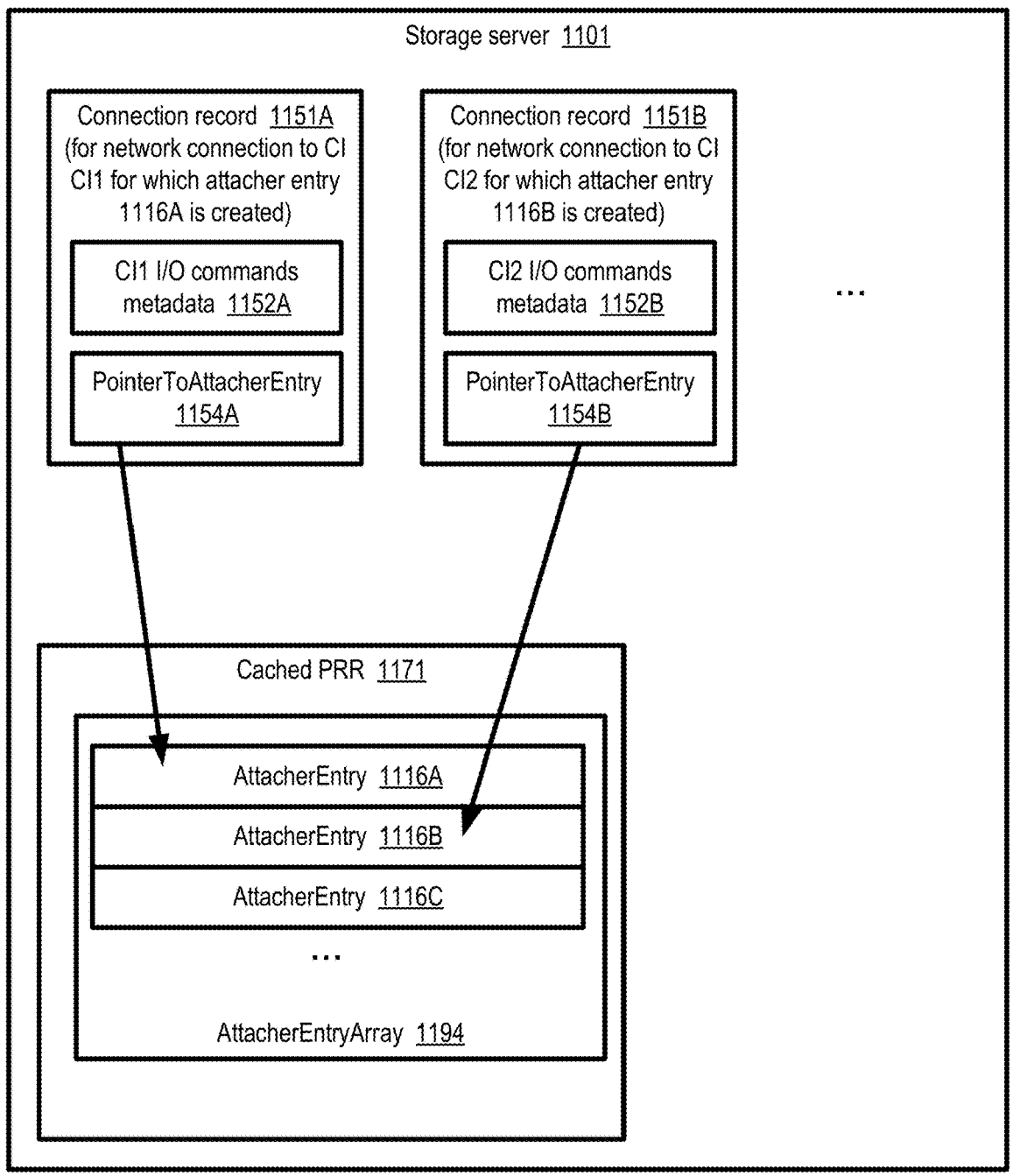
FIG. 11 illustrates an example use of pointers to per-attachment entries stored within a cached version of a reservation record at a storage server of a block storage service, according to at least some embodiments.

FIG. 11 illustrates an example use of pointers to per-attachment entries stored within a cached version of a reservation record at a storage server of a block storage service, according to at least some embodiments. At storage server 1101 of the BSS, one or more partitions of one or more logical volumes may be stored. A given logical volume can be programmatically attached to multiple compute instances as indicated earlier, with reads and writes being directed to the partition at the storage server 1101 from any of the attached compute instances via respective network connections.

Corresponding to each network connection established with an attached compute instance, a respective connection record 1151 may be maintained at the storage server 1101 (e.g., typically within main memory of the storage server) in the depicted embodiment. For example, connection record 1151A may be maintained for a network connection to a compute instance CI1, while connection record 1151B may be maintained for a network connection to a different compute instance CI2. The connection records may each comprise one or more kinds of metadata pertaining to the attached compute instances. Metadata 1152A about CI1 I/O commands that have been processed at the storage server may, for example, include statistics about the amount of data written or read from CI1, the distribution of the sizes of the I/Os performed on behalf of CI1, the temporal distribution of the I/O commands from CI1, and so on in the depicted embodiment. Similar metadata 1152B pertaining to CI2's I/O commands may be stored in connection record 1151B.

As discussed in the context of FIG. 4, a PRR for a logical volume may include an array or list (AttacherEntryArray 1194 in FIG. 11) of attacher entries (such as entries 1116A, 1116B, or 1116C), with one entry per attached compute instance in some embodiments. In order to determine how to respond to a given I/O command, the attacher entry of the compute instance may have to be accessed (e.g., to determine the PRSN_abort value for the compute instance). In some embodiments, there may be hundreds or even thousands of attached compute instances, and hence hundreds or thousands of attacher entries. A given worker thread accessing the attacher entry for a compute instance may have to find the correct attacher entry in the array.

In order to help further speed up I/O command processing at storage server 1101, respective pointers to the attacher entries for the compute instances may be maintained in the connection records 1151 in the depicted embodiment. PointerToAttacherEntry 1154A may for example, comprise the index of AttacherEntry 1116A which represents CI1 within cached PRR 1171, while PointerToAttacherEntry 1154B may comprise the index of AttacherEntry 1116B which represents CI2. Whenever an I/O command is received via a network connection, the pointer to the attacher entry for the corresponding compute instance may be accessed from the corresponding connection record to enable the worker thread assigned the command to quickly find the right attacher entry, without for example having to perform a sequential search among all the entries of the attacher entry. As a result of using the pointers stored within the connection records, the processing of the I/O command may be made more efficient in various embodiments.

Figure 12:
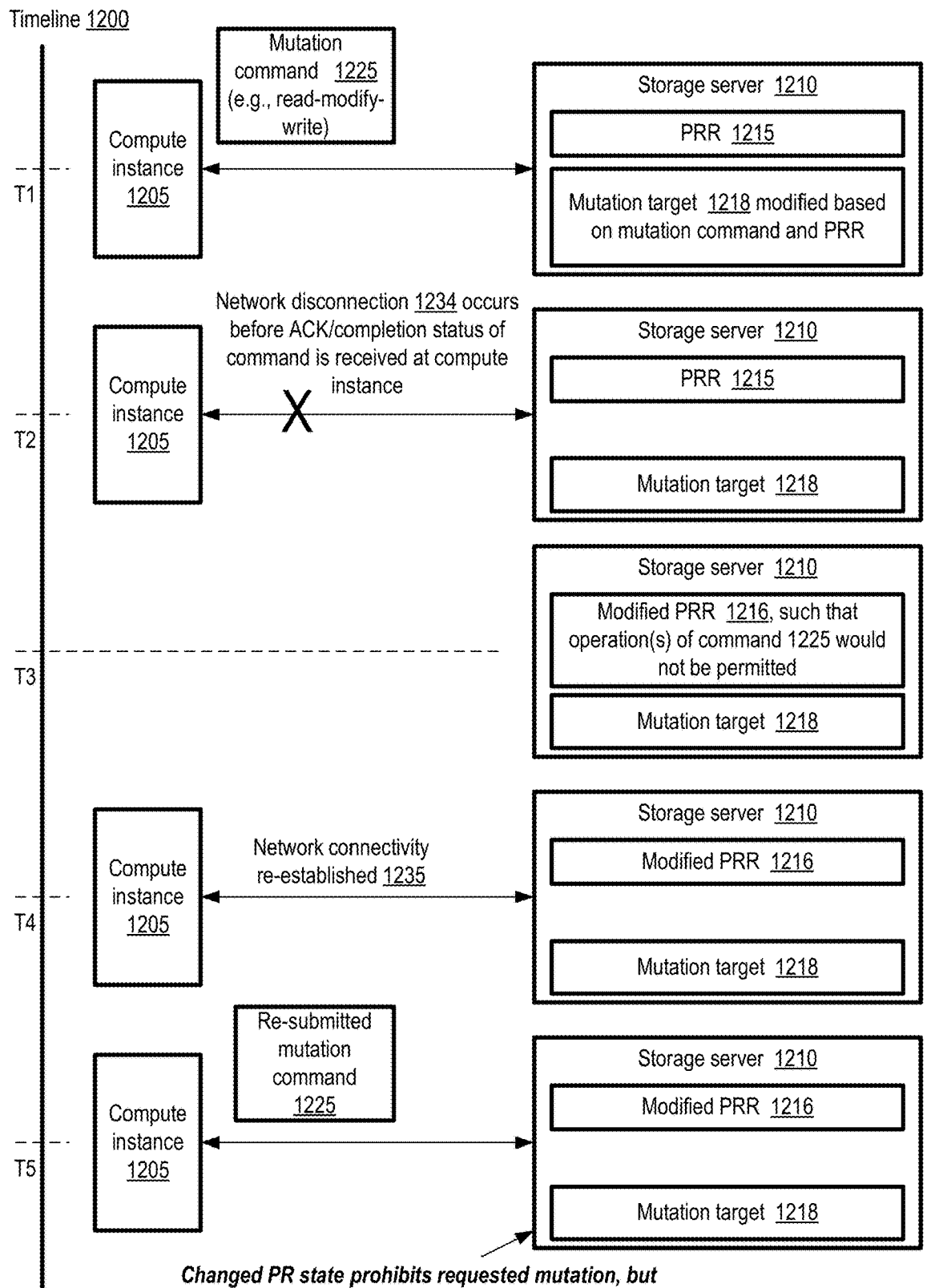
FIG. 12 illustrates an example scenario in which, subsequent to re-establishment of network connectivity between a compute instance and a block storage server after a network disconnection, a mutation command may be re-submitted from the compute instance, according to at least some embodiments.

As indicated earlier, mutation commands (i.e., commands that result in changes to logical volume data or associated PRRs) may be sent from compute instances to storage servers of a BSS via network connections. FIG. 12 illustrates an example scenario in which, subsequent to re-establishment of network connectivity between a compute instance and a block storage server after a network disconnection, a mutation command may be re-submitted from the compute instance, according to at least some embodiments. At time T1 along timeline 1200, a mutation command 1225 may be submitted from a compute instance 1205 via a network connection to a storage server 1210 of a BSS. The mutation command may indicate changes to be applied to a mutation target 1218, which may comprise a data partition of a logical volume or a PRR of the logical volume. Note that to fulfill a given mutation command one or more lower-level operations may need to be performed in some cases—e.g., the command may indicate that a read-modify-write sequence of operations is to be performed. As such, the operations indicated in a given mutation command may, when considered collectively, be non-atomic in nature; it may be possible to complete some of the operations without completing them all.

At the storage server 1210, the reservation state indicated by a PRR 1215 (which may in some embodiments be stored in a cache as described earlier) may be examined to determine whether the operations indicated in the command are permitted or not. If they are permitted, the mutation target 1218 may be modified based on the mutation command.

Under normal (non-failure scenarios), an acknowledgement or command completion status indicating that the mutation target has been modified as requested may be sent via the network and received at the compute instance 1205. However, in the scenario shown in FIG. 12, at time T2, a network disconnection 1234 may occur before the completion status message is received at the compute instance. The storage server 1210 may have sent the completion status shortly before the network disconnection (an unplanned termination of the network connection between the compute instance and the storage server). Such disconnections may occur due to any of a variety of reasons, such as a failure of a networking hardware or software component along the path between the storage server and the compute instance.

At time T3 along timeline 1200, the PRR may be modified at the storage server 1210, e.g., in response to a command from another compute instance or from an administrator. The modified PRR 1216 may no longer permit the operations that were requested in the mutation command 1225.

At time T4, network connectivity may be re-established 1235, e.g., as a result of a connection establishment request sent from the compute instance to the storage server after a BSS component running at the compute instance detects that the earlier connection was terminated prematurely. Because the compute instance 1205 did not receive the completion status of the mutation command 1225, the mutation command may be re-submitted at time T5. In at least some embodiments, a client-side component of the BSS running at the virtualization host of the compute instance (such as a block storage virtualization manager (BSVM) of the kind shown in FIG. 1, an operating system component, or an application-layer component) may maintain a queue of as-yet-unacknowledged commands sent to various storage servers, and a given queued command may be re-submitted if the acknowledgement for it is not received within a threshold time interval.

The changed reservation state, indicated in modified PRR 1216, may now prohibit the mutation command's operations, so one possibility is that the storage server sends a response indicating that the command is rejected due to a reservation conflict. However, the mutation target 1218 has already been changed as per the request, so this presents a problem: If an application program running at the compute instance, on whose behalf the mutation command was submitted, is notified that the command is rejected, the application may expect to encounter the unmodified version of the mutation target when it next reads the mutation target. Ideally, the storage server 1210 needs to be able to identify the command as a re-submission, and also needs to be able to determine whether the previously-submitted version of the mutation command was completed or not (as per the reservation state at the time the previous version was received. In various embodiments, to enable the server to respond correctly to re-submitted mutation commands, a mutation history store may be maintained, and individual mutation commands may be tagged with monotonically increasing command sequence numbers as described below.

Figure 13:
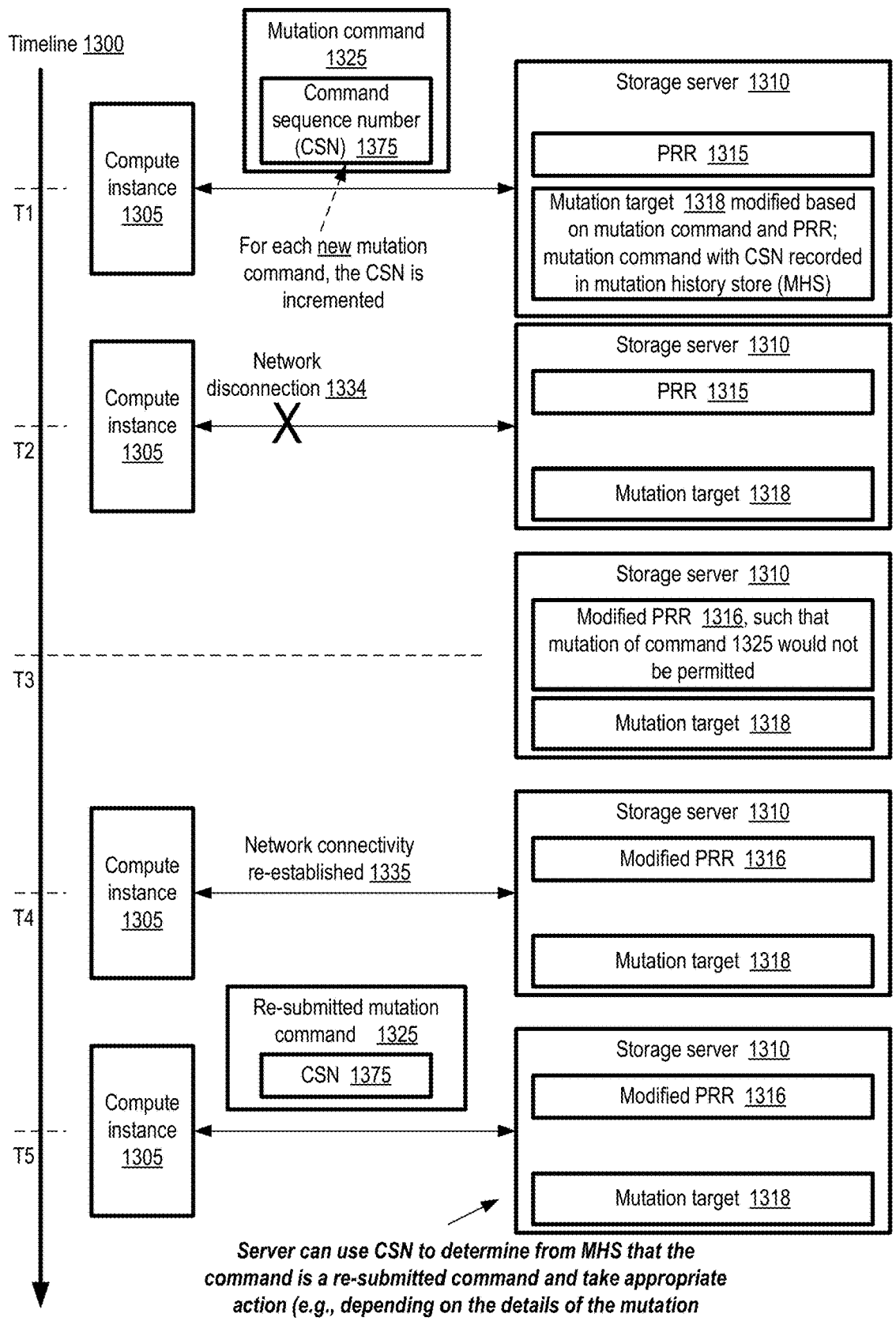
FIG. 13 illustrates an example scenario in which a mutation history store may be utilized to handle re-submitted mutation commands at a block storage service, according to at least some embodiments.

FIG. 13 illustrates an example scenario in which a mutation history store may be utilized to handle re-submitted mutation commands at a block storage service, according to at least some embodiments. A timeline 1300 with an analogous sequence of events to those of timeline 1200 of FIG. 12 is shown in FIG. 13. At time T1 along timeline 1300, a mutation command 1325 may be submitted from a compute instance 1305 via a network connection to a storage server 1310 of a BSS. The mutation command may indicate changes to be applied to a mutation target 1318, which may comprise a data partition of a logical volume or a PRR of the logical volume. A command sequence number (CSN) 1375, which is incremented at the compute instance 1305 for each new (not re-submitted) mutation command submitted to the storage server from the compute instance 1305, may be included in the mutation command. In some embodiments, the CSN may be incremented for each command submitted, regardless of whether the command is a mutation command or a read-only command.

At the storage server 1310, the reservation state indicated by a PRR 1315 (which may in some embodiments be stored in a cache as described earlier) may be examined to determine whether the operations indicated in the command are permitted or not. If they are permitted, the mutation target 1318 may be modified based on the mutation command, and a record of the mutation command (including the CSN) may be stored in a mutation history store (MHS) of the storage server.

Under normal (non-failure scenarios), as in the scenario depicted in FIG. 12, an acknowledgement or command completion status indicating that the mutation target has been modified as requested may be sent via the network and received at the compute instance 1305. However, at time T2 along timeline 1300, a network disconnection 1334 may occur before the completion status message is received at the compute instance. The storage server 1310 may have sent the completion status shortly before the network disconnection.

At time T3 along timeline 1300, the PRR may be modified at the storage server 1310, e.g., in response to a command from another compute instance or from an administrator. The modified PRR 1316 may no longer permit the operations that were requested in the mutation command 1325.

At time T4, network connectivity may be re-established 1335, e.g., as a result of a connection establishment request sent from the compute instance to the storage server after a BSS client-side component running at the compute instance 1305 detects that the earlier connection was terminated prematurely. Because the compute instance 1305 did not receive the completion status of the mutation command 1325, the mutation command may be re-submitted at time T5. The same CSN 1375 may be included in the re-submitted version as the CSN included in the originally submitted version of the mutation command.

At the storage server, the CSN included in the re-submitted command, and the record stored earlier in the MHS, may be used to determine that (a) the command is a re-submission and (b) that the operations of the command were applied earlier based on the state of the PRR at the time the earlier submission was received. Accordingly, the storage server may be able to take the appropriate action with respect to the re-submission, without using the modified PRR in various embodiments. The appropriate action may include, for example, sending a successful completion acknowledgement for the re-submission (e.g., in the case where the mutation was directed to the PRR), or (in some cases) re-applying requested operations. The requested operations may be re-applied to handle some edge scenarios in which the set of operations indicated in the mutation command is non-atomic, and/or if one of the logical volume partitions to which a write was directed in the original mutation command was merged with another partition after the mutation command operations were completed at just one of the pre-merged partitions.

Figure 14:
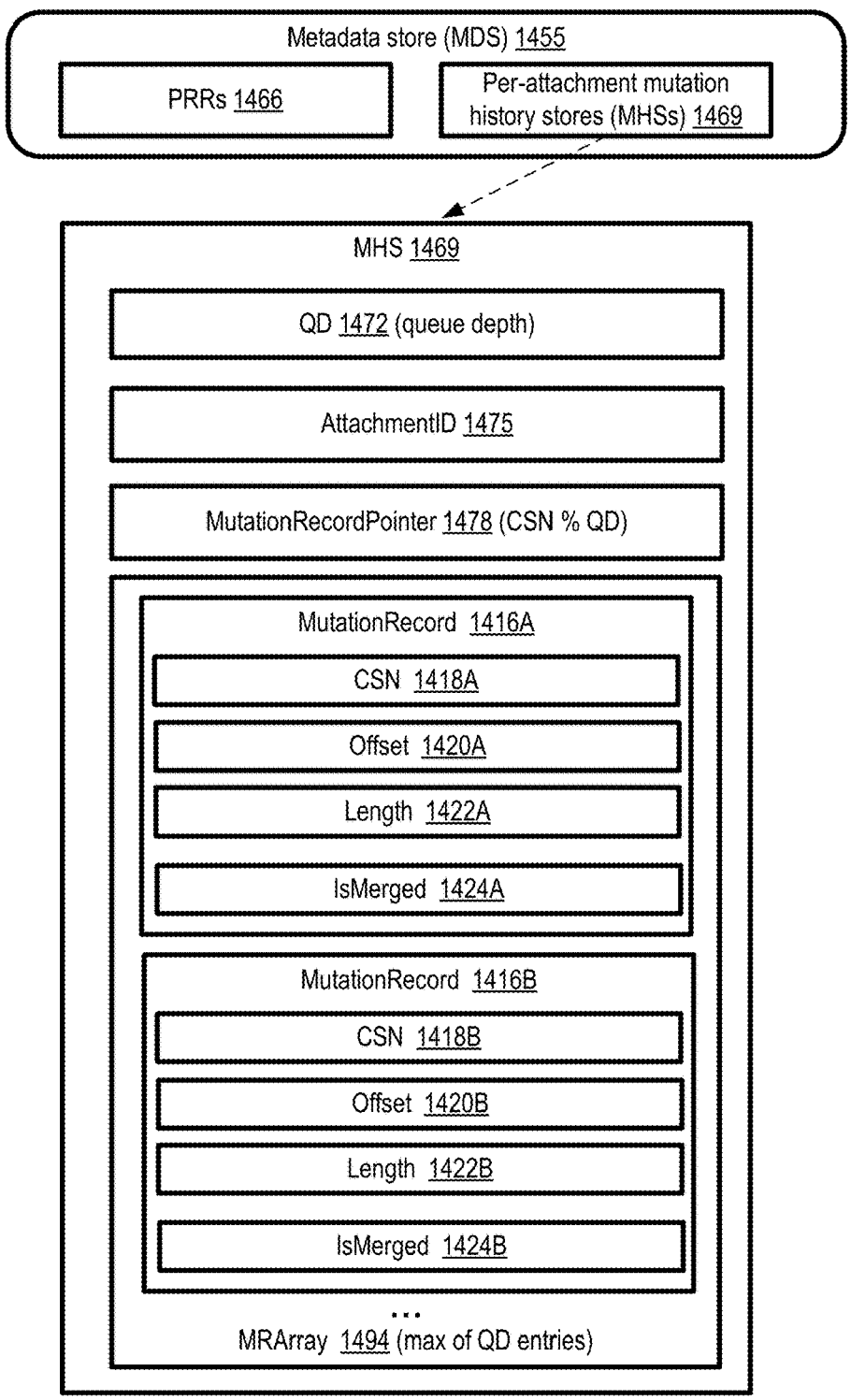
FIG. 14 illustrates example contents of a mutation history store maintained at a storage server of a block storage service, according to at least some embodiments.

FIG. 14 illustrates example contents of a mutation history store maintained at a storage server of a block storage service, according to at least some embodiments. In the depicted embodiment, a persistent metadata store (MDS) 1455 of a storage server may comprise PRRs 1466 for the logical volumes whose partitions are stored at the server, as well as per-attachment mutation history stores (MHSs) comprising records of some number of recently completed mutation commands for each attached compute instance.

An MHS 1469, which may also be referred to as a mutation history buffer, for a given compute instance which is programmatically attached to a logical volume whose partition is stored at the storage server may include a queue depth field QD 1472 indicative of the maximum number of mutation records to be included in the MHS. In some embodiments, the QD may represent the maximum number outstanding mutation commands, for which acknowledgements or completion status indicators have not yet been received, that are permitted from a given attached compute instance. An identifier of the attachment of the volume and the compute instance may be stored in the AttachmentID 1475 field of the MHS. For between 0 and QD recent mutation commands that have been fulfilled (i.e., by modifying the contents of a logical volume partition, or by modifying metadata stored in other entries of the MDS, depending on the mutation target) on behalf of the attached compute instance, a respective entry referred to as a MutationRecord 1416 (such as MutationRecord 1416A or MutationRecord 1416B) may be included in an MRArray 1494 structure within the MHS 1469 in the depicted embodiment. The MRArray may be implemented as a circular buffer in some implementations, with new entries overwriting older ones as new mutation commands are fulfilled. A MutationRecordPointer 1478, computed as the modulus of the most recent CSN encountered at the storage server (or stored within the MHS) with respect to the QD (CSN % QD) may be stored in the MHS in some embodiments, enabling a worker thread to quickly access the most recently-added entry within the MRArray. In some implementations, QD may be a parameter that is selected by the BSS control plane; in other implementations, the QD may be determined as part of a negotiation between a client-side component of the BSS and the storage server, e.g., at the time that the logical volume whose partition is stored at the storage server is brought online. In at least some embodiments, different QDs may be used for respective BSS customers, for respective client compute instances that access BSS volumes, and/or for different BSS volumes of the same client. In one implementation, powers of two (e.g., 256, 128 or 64) may be chosen as the QDs.

A given mutation record 1416 may include a CSN 1418 (e.g., CSN 1418A or CSN 1418B), an offset 1420 (e.g., offset 1420A or offset 1420B) of a write performed as one of the operations of the mutation, a length 1422 (e.g., length 1422A or length 1422B) of the write (expressed for example in bytes, kilobytes, or similar units), and an IsMerged field 1424 (e.g., IsMerged 1424A or IsMerged 1424B). Recall that there may at least two kinds of targets which may be updated in response to mutation commands at a BSS storage server supporting persistent reservations: the logical volumes themselves, and the PRRs. For mutation commands directed to PRRs, in at least some embodiments, the offset 1420 and the length 1422 may be set to zero or some special value such as −1 to indicate that the mutation record was directed to a PRR as opposed to the logical volume partition. For mutation commands that are directed to PRRs, in at least some embodiments, a success response may be sent to the command submitter without performing any operations indicated in the commands. This may be done, for example, because mutation commands directed to PRRs cannot require the participation of multiple storage servers (as opposed to volume data write commands, which can in some cases span multiple storage servers), so a PRR mutation command which was recorded in the MHS can be assumed to have succeeded in its entirety.

According to some embodiments, two or more partitions of a given logical volume managed by a BSS may be combined or merged in response to client requests for changes in volume performance, size or other parameters. In a scenario in which a group of partitions is merged, mutation records of the partitions of the group may also have to be merged to represent, within a single mutation record, operations that were performed on the different source partitions. The IsMerged field 1424, such as 1424A or 1424B, may be used to indicate whether the corresponding mutation record was created as a result of a merger of mutation histories of distinct partitions in the depicted embodiment. If IsMerged is true for a given mutation record, checking whether a newly-received command is a re-submission may require more complex logic than checking whether the offset and length indicated in the newly-received command match the mutation record's offset and length fields. Accordingly, in some implementations, if IsMerged is true, the operation indicated in a newly-submitted mutation command with a matching CSN may be re-performed without checking reservation permissions and without checking whether the offset and size fields match the mutation record. In other implementations, is IsMerged is true, an error message indicating the occurrence of a partition merger subsequent to the original mutation command may be sent to the command submitter.

An MHS may comprise other metadata than the fields shown in FIG. 14 in some embodiments. For example, in some embodiments, individual mutation records may include a ResultStatus field, e.g., in addition to the CSN, Offset, Length and IsMerged fields. The ResultStatus field may indicate the result code or status that the storage server prepared for the corresponding mutation command and had sent to the submitter of the mutation command, such as a success status. If the operations of the re-submitted version of a mutation command are successful, the saved ResultStatus may be sent to the submitter in some embodiments.

In at least one embodiment, the MHS may store respective MutationRecord entries not only for successfully-completed mutation commands, but also for entries whose operations were rejected as a result of a reservation conflict or lack of permissions, with a ResultStatus field indicating that the command was rejected due to the conflict. In one such embodiment, if such a command (with its CSN less than the max-CSN sent by the storage server upon reconnection) is re-submitted from a compute instance, the storage server may look up the entry within the MHS, and re-send the rejection result status to the submitter.

In some embodiments, as new mutation commands with CSNs greater than the max-CSN are received after a reconnection and are completed, entries within the MRArray may be overwritten. For example, if the maximum number of entries permitted in the MRArray is QD, and a mutation command with CSN CSN1 (which is greater than max-CSN) is obtained, the MutationRecord at index CSN1% QD may be overwritten. In one embodiment, the storage server may maintain a bit array indicating which of the MRArray entries has been overwritten after the reconnect, and which have not yet been overwritten. When all the entries have been overwritten, in such an embodiment the storage server may no longer need to check the MHS when a new mutation command is received (even if the new mutation command's CSN is less than the last max-CSN sent to the compute instance) although entries in the MHS (at indexes based on the completed commands' CSN % QD) may continue to be overwritten as the new commands are completed. In some embodiments, a client-side component of the BSS, running on a virtualization host at which an attached compute instance runs, may be provided the MHS for the attachment by the storage server upon reconnection. The client-side component may then use the MHS to determine which of its as-yet-unacknowledged mutation commands should be resubmitted—for example, the client may not need to resubmit commands which did not succeed due to reservation conflicts (such unsuccessful commands may be identified by examining the MHS).

Figure 15A:
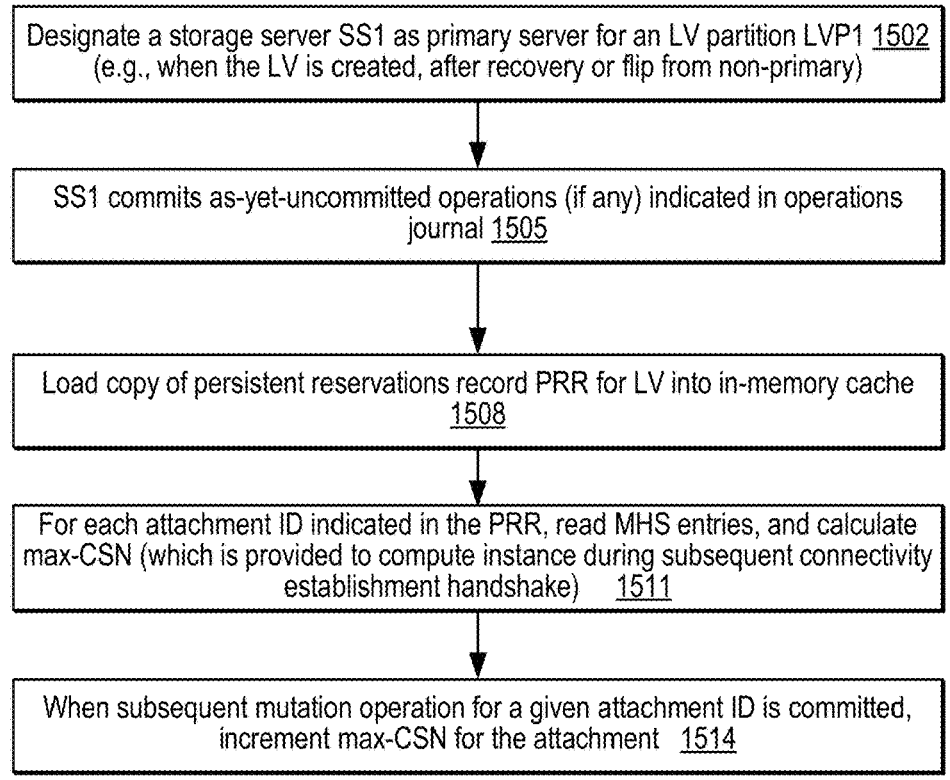
FIG. 15A is a flow diagram illustrating aspects of operations associated with computing a maximum-command-sequence-number for each compute instance which is programmatically attached to a logical volume at a block storage service, according to at least some embodiments.

As mentioned earlier, each mutation command sent from a compute instance to a BSS storage server may be required to include a CSN, which may be implemented as a monotonically increased integer, starting with a max-CSN value (maximum sequence number recorded thus far for the compute instance), for each successive command to a given partition of an attached logical volume in some embodiments. When a storage server is designated as the primary server for a given partition of a logical volume, the max-CSN applicable to each compute instance attached to the logical volume may have to be sent to the compute instance (or the block storage virtualization manager for the compute instance) so that the appropriate incremented CSNs can be assigned to its mutation commands going forward. FIG. 15A is a flow diagram illustrating aspects of operations associated with computing a maximum-command-sequence-number for each compute instance which is programmatically attached to a logical volume at a block storage service, according to at least some embodiments. A storage server SS1 may be designated as a primary storage server for a logical volume partition LVP1 (element 1502), e.g., when the logical volume is created, after a recovery following a failure, or a flip of status of a non-primary storage server to a primary.

As indicated earlier, a replica of an operations journal indicating mutations that have been approved (and for which success indicators have been sent to the mutation command submitters) may be maintained at a BSS storage server in at least some embodiments. SS1 may commit (e.g., using a commit propagator of the kind introduced earlier) as-yet-uncommitted operations indicated in the operations journal in the depicted embodiment after SS1 is designated as the primary (element 1505). SS1 may then load a copy of the PRR for the logical volume into an in-memory cache of the kind introduced earlier (element 1508).

As shown in FIG. 4, a respective attacher entry (indicating an attachment identifier) may be stored in the PRR for each compute instance attached to the logical volume to which LVP1 belongs. For each attachment identifier indicated in the PRR, the mutation history store (MHS) mutation record entries for that attachment identifier may be read, and the max-CSN may be computed at SS1 based on the CSNs stored in the MHS (element 1511). The max-CSN may be provided to the corresponding compute instance during the subsequent connectivity establishment handshake with SS1 in the depicted embodiment; as such, the operations corresponding to elements 1505, 1508 and 1511 may be performed prior to establishing connectivity between SS1 and the attached compute instances. When a subsequent mutation operation or command for a given attachment ID is committed, max-CSN for that attachment may be incremented at SS1 in some embodiments (element 1514).

Figure 15B:
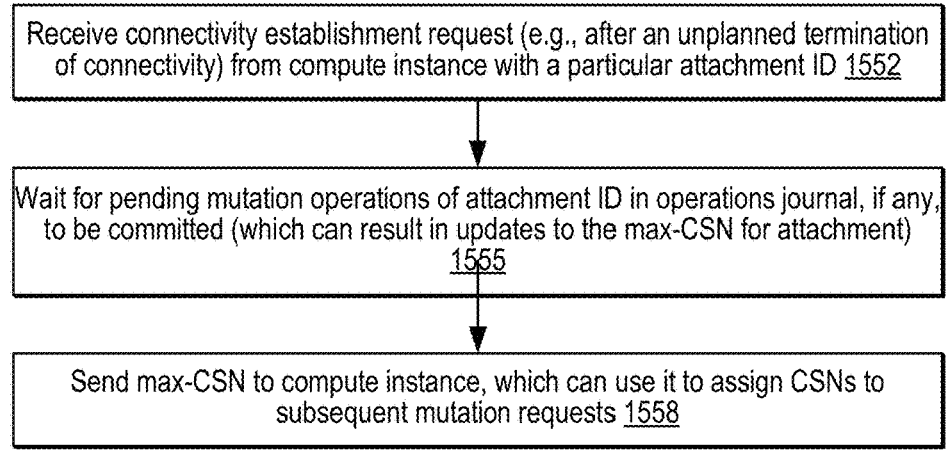
FIG. 15B is a flow diagram illustrating aspects of operations which may be performed at a storage server of a block storage service in response to a request to re-establish connectivity with a compute instance after a network disconnection event, according to at least some embodiments.

FIG. 15B is a flow diagram illustrating aspects of operations which may be performed at a storage server of a block storage service in response to a request to re-establish connectivity with a compute instance after a network disconnection event, according to at least some embodiments. The storage server may receive a connectivity establishment request (e.g., at some point after an unplanned termination or disruption of connectivity) from the compute instance, with a particular attachment identifier of the compute instance indicated in the request (element 1552).

The storage server may wait for pending mutation operations associated with that attachment identifier, if any such operations happen to be in the operations journal maintained at the storage server, to be committed (element 1555). The commits of such operations may in turn result in new mutation records being stored in the MHS, and also result in updates to max-CSN for the attachment identifier. The max-CSN may be sent to the compute instance as part of the messages exchanged during a connectivity establishment handshake, enabling the compute instance (or the corresponding BSVM) to assign CSNs to subsequent mutation commands sent to the storage server (element 1558).

In some embodiments, instead of sending the max-CSN as part of the reconnection workflow, the storage server may simply send the MHS associated with the attachment to the compute instance (i.e., to a client-side component of the BSS which is associated with the compute instance). In one embodiment, neither a max-CSN nor the MHS may be sent to the compute instance during the reconnection, although both the storage server and the compute instance may continue to increment CSN as new commands are completed. Instead, when a new mutation command is received at the storage server, with a CSN CSN1, the entry E1 within the MHS maintained at the server whose index is CSN1% QD may be examined at the storage server. If the CSN CSN2 of E1 is equal to CSN1, the storage server may assume that the command has been processed successfully at the server, but the result or acknowledgement has not reached the compute instance, so the operations of the command may be re-performed. If CSN2 is less than CSN1, this may indicate that the command is new (not a re-submission), so the storage server may process the command. If CSN2 exceeds CSN1, the storage server may discard the mutation command as an erroneously-submitted command. In some embodiments, a storage server may hold a lock associated with each CSN while processing mutation commands with that CSN (e.g., to avoid multiple commands with the same CSN from corrupting logical volume data or metadata).

Figure 16:
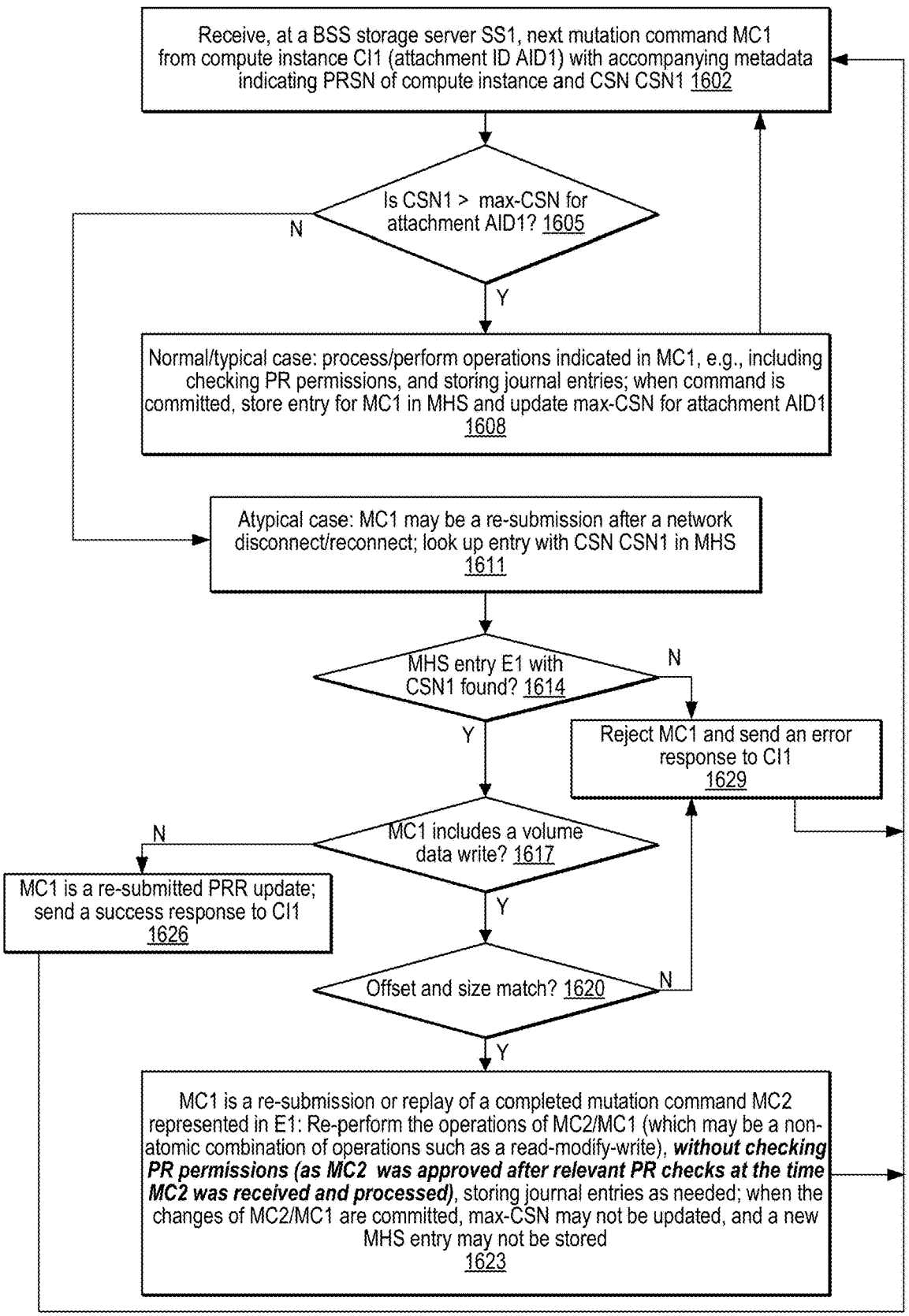
FIG. 16 is a flow diagram illustrating aspects of operations which may be performed, using a mutation history store, at a storage server of a block storage service in response to a mutation command, according to at least some embodiments.

FIG. 16 is a flow diagram illustrating aspects of operations which may be performed, using a mutation history store, at a storage server of a block storage service in response to a mutation command, according to at least some embodiments. As shown in element 1602, the next mutation command MC1 may be received from a compute instance CI1 at a storage server SS1 of a BSS similar in features and functionality to BSS 102 of FIG. 1. MC1 may in general indicate one or more lower-level operations which are to be performed at SS1 if permitted, including at least one modification operation (such as a write directed to data of a logical volume stored at least in part at the storage server, or an update to a PRR of the logical volume). The attachment identifier of CI1 with respect to the logical volume may be AID1. In embodiments in which partitions of the logical volume are replicated at a primary SS and at least one non-primary SS, SS1 may be the primary SS for the partition to which the mutation command applies (or the primary SS of the partition whose SS is the designated PRR state modification coordinator). In the cases in which the mutation command includes a write directed to logical volume data, the offset within the logical volume at which the write is to be applied, and the size of the write (e.g., the number of bytes that are to be written or updated due to the write) may be indicated in the mutation command. In various embodiments, a persistent reservation sequence number (PRSN) indicating the latest state of a PRR of the logical volume which is known at CI1, as well as a CSN CSN1 for the mutation command may be included in the mutation command. CSN1 may have been assigned to the mutation command at the command source CI1, e.g., by incrementing an integer counter maintained for CI1's mutation commands in some embodiments. CSNs such as CSN1 may indicate the order in which different mutation commands directed to the logical volume or the PRR are sent or submitted from CI1 to the storage server SS1 in various embodiments.

At SS1, a max-CSN value (which may be computed initially according to the logic illustrated in FIG. 15A) for each attached compute instance may be maintained. If the CSN CSN1 is greater than the max-CSN for the attachment identifier AID1 (as determined in operations corresponding to element 1605), this may indicate that MC1 is not a re-submitted command, and should be processed using the normal logic implemented for new commands received at SS1 (element 1608). In the normal/typical case, the persistent reservation (PR) permissions currently indicated in the PRR for the logical volume (or for modifying the PRR itself) may be checked with respect to the lower-level operations of MC1, and the operations may be performed if permitted by the PRR. As indicated above, in some cases lower-level modification operations may first be entered quickly into an operations journal, and committed later. When the command MC1 is committed (or its constituent lower-level operations are committed), an entry representing MC1 may be inserted into a mutation history store (MHS) or mutation history buffer maintained at SS1. In at least some embodiments, the MHS may be replicated at a primary SS and at least one non-primary SS for a logical volume partition; in other embodiments, the MHS may not necessarily be replicated. When MC1 is committed, the max-CSN for the attachment with identifier AID1 may also be updated (e.g., to match CSN1) in some embodiments.

If, in operations corresponding to element 1605, it is determined that CSN1 is not greater than the max-CSN for AID1, the atypical case of mutation command processing may be implemented in the depicted embodiment. As indicated in element 1611, a lookup or search for an entry with CSN CSN1 may be conducted within the MHS to determine whether MC1 is a re-submission after a network disconnection between SS1 and CI1 followed by a reconnection.

An MHS entry E1 with a matching CSN CSN1 may be found within the MHS (element 1614). If so, in the depicted embodiment, a determination may be made whether MC1 comprises a write I/O directed to the data of the logical volume (element 1617). If MC1 comprises such a write, and the write offset and write size indicated in MC1 match the write offset and write size indicated in E1 (as detected in operations corresponding to element 1620), this may be interpreted as indicating that MC1 is a re-submission of an earlier mutation command MC2 which was completed (after checking the PRR state at the time to ensure that the access permissions needed were granted to CI1) at SS1. In at least some embodiments, the lower-level operations of MC2 may be re-performed without checking PR permissions again, storing journal entries as needed (element 1623). Note that the lower-level operations of MC2 (the same as the lower-level operations of MC1) may in some cases comprise a non-atomic sequence of operations such as a read-modify-write sequence, and some of the lower-level operations may apply to other partitions (managed at other storage servers) or have been affected by a merge of partitions of the logical volume, so simply sending a response indicating that MC1 succeeded may not suffice in at least some implementations. In at least some embodiments, when the changes of MC2 or MC1 are committed, the max-CSN for AID1 may not have to be updated, and a new MHS entry representing MC1 need not be stored.

In operations corresponding to element 1617, in some cases it may be determined that MC1 does not include a data write to the logical volume, i.e., that MC1 is a re-submitted PRR update. In this scenario, a success response for MC1 may be sent to CI1 in the depicted embodiment, without checking permissions using the current PRR and without re-performing any lower-level operations indicated in MC1. This may be done, for example, because PRR modifications are handled at a single storage server, and may not be split across multiple storage servers or affected by merges of partitions in such embodiments. As such, there may be no need to re-perform the PRR modifications which were successfully completed earlier.

In operations corresponding to element 1620, in some cases it may be determined that the write offsets and sizes of the entry E1 and MC1 do not match. This may occur if for example the write offset fields and or the write size field of E1 and/or MC1 got corrupted, while the CSN field did not get corrupted (or the CSN field also got corrupted and ended up resulting in a match detected in element 1614). In such a scenario, MC1 may be rejected and an error response may be sent to CI1 (element 1629). In operations corresponding to element 1614, in some cases no matching entry E1 may be found in the MHS despite its CSN CSN1 being lower than max-CSN. This may, for example, occur due to a bug, due to data corruption, or due to running out of space in the MHS (recall that in some embodiments the MHS may store up to a maximum of QD entries for mutation commands as discussed earlier in the context of FIG. 14). In such a scenario, MC1 may also be rejected and an error response may be sent to CI1 (element 1629). After MC1 is processed, using operations corresponding to elements 1608, 1623, 1626 or 1629, in various embodiments SS1 may wait for the next mutation command (or read-only command) from CI1 in various embodiments. When the next mutation command is received, it too may be processed using the logic indicated in elements 1605 onwards.

It is noted that in various embodiments, some of the operations shown in the flow diagrams of FIG. 5, FIG. 7A, FIG. 7B, FIG. 8, FIG. 9, FIG. 10, FIG. 15A, FIG. 15B and/or FIG. 16 may be implemented in a different order than that shown in the corresponding figure, or may be performed in parallel rather than sequentially. Additionally, some of the operations shown in these flow diagrams may not be required in one or more implementations.

Figure 17:
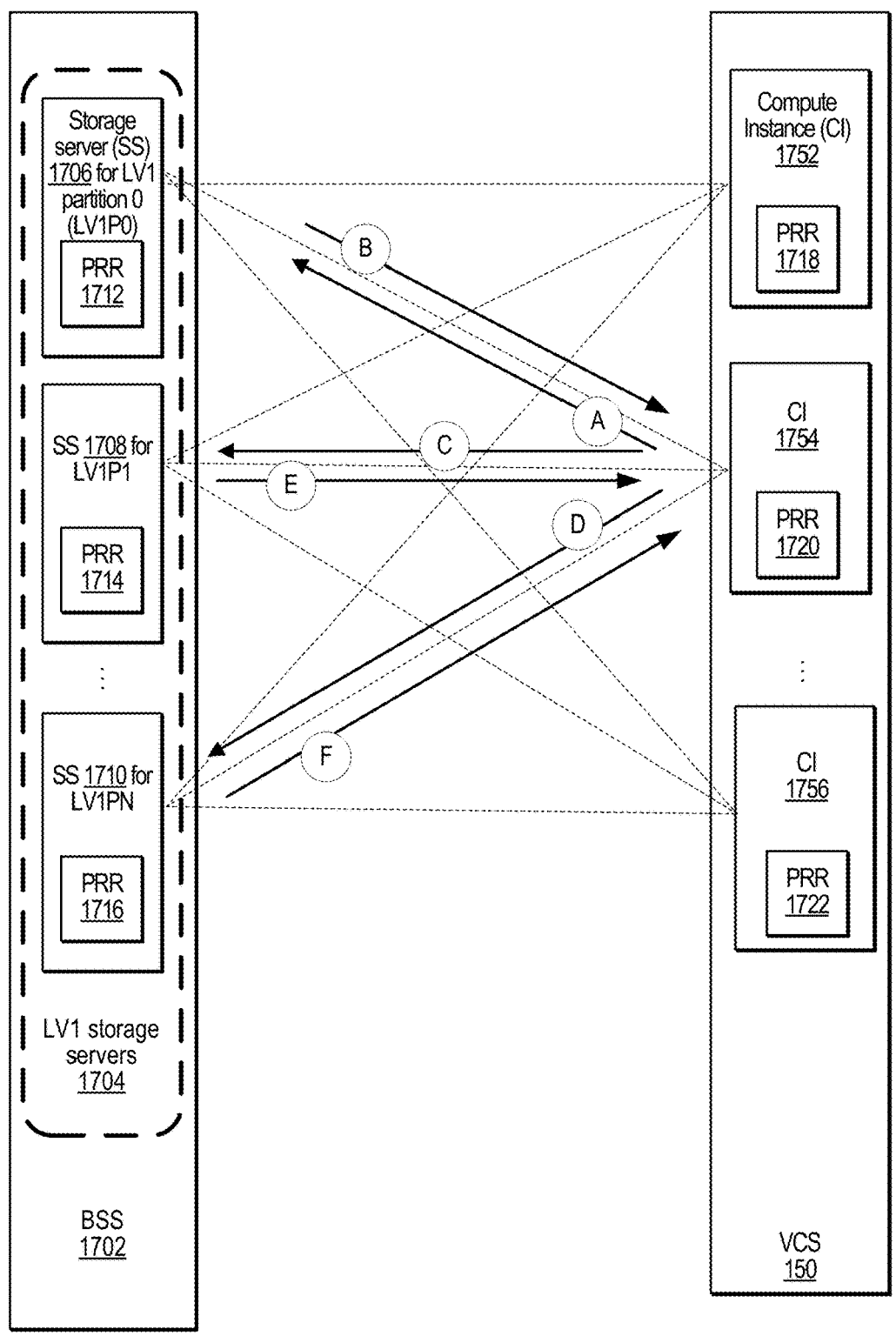
FIG. 17 and FIG. 18 collectively illustrate messages that may be exchanged between compute instances and storage servers of a block storage service to implement a protocol for fault-tolerant reservation state distribution, according to at least some embodiments.
Figure 18:
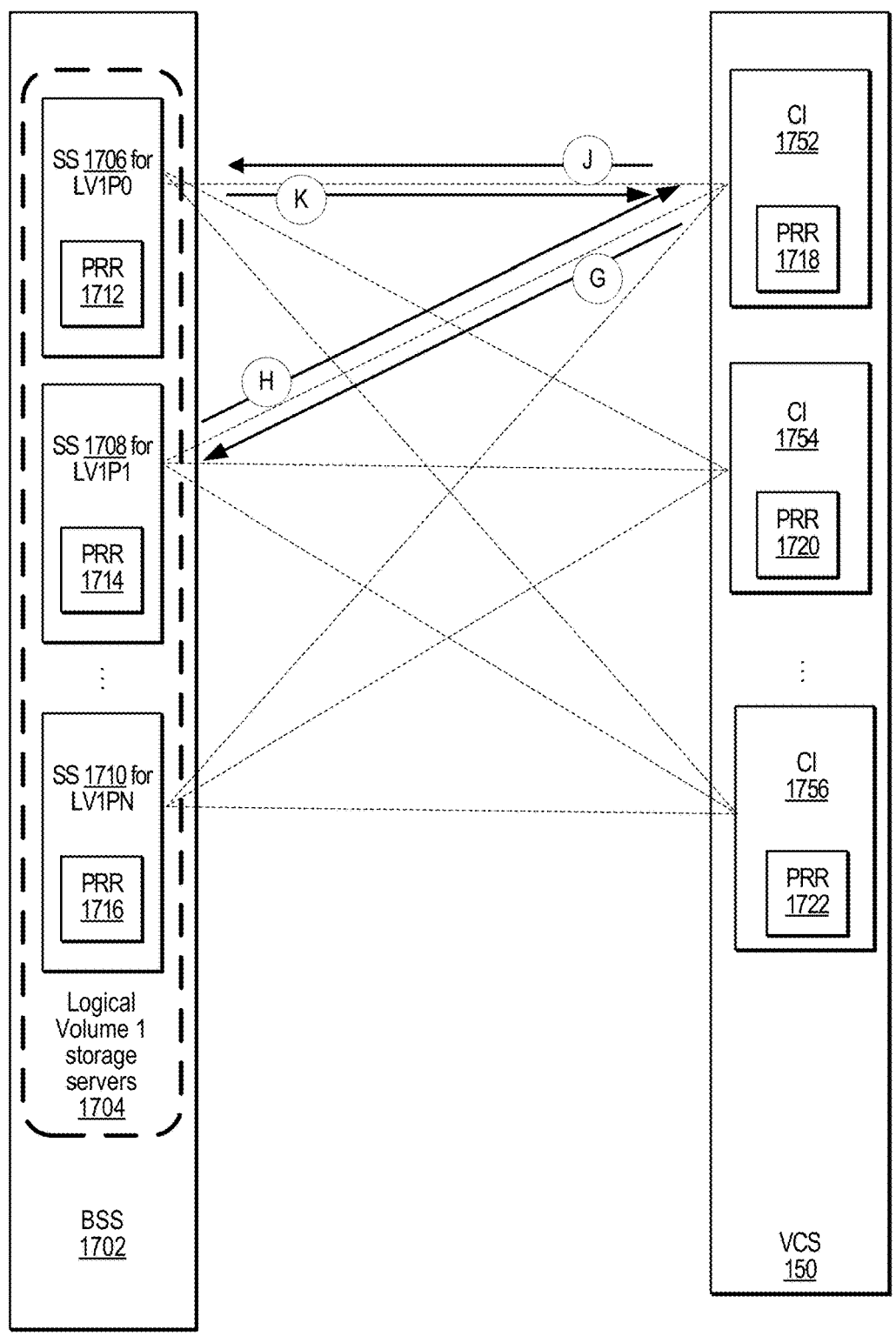

As indicated earlier, in some embodiments, reservation state as represented in PRRs may be distributed among multiple BSS storage servers at which respective partitions of a given logical volume are stored, and among multiple compute instances that are programmatically attached to the logical volume in a fault-tolerant manner. FIG. 17 and FIG. 18 collectively illustrate messages that may be exchanged between compute instances and storage servers of a block storage service to implement a protocol for fault-tolerant reservation state distribution, according to at least some embodiments. At a BSS 1702, similar in features and functionality to BSS 102 of FIG. 1, a logical volume LV1 may be partitioned across several storage servers 1704. For example, storage server (SS) 1706 may store LV1 partition 0 (LV1P0), SS 1708 may store LV1 partition 1 (LV1P1), and SS 1710 may store LV1 partition N (LV1PN). SS 1706 may be designated as the coordinator of changes to reservation state metadata maintained for LV1. Each of storage servers SS 1706, SS 1708 and SS 1710 may store a respective version of a PRR representing the most recent known state of the reservation metadata of LV1 in the depicted embodiment—e.g., SS 1706 stores PRR 1712, SS 1708 stores PRR 1714, and SS 1710 stores PRR 1716. Note that while a given partition of LV1 may be managed using a primary SS and one or more non-primary SSs, at which respective replicas of the given partition may be stored, only primary SSs are shown in FIG. 17 and FIG. 18. In the depicted embodiment, each SS may maintain a cache of PRRs, as well as an operations journal, and a persistent metadata store (MDS) including a mutation history store or buffer of the kind discussed earlier.

The BSS may support programmatic attachments of individual logical volumes to multiple compute instances, enabling I/O commands (and commands to modify PRRs) to be submitted from any of the compute instances in the depicted embodiment. For example, compute instances (CIs) 1752, 1754 and 1756 may all be programmatically attached to LV1, e.g., in response to respective commands submitted to BCS control plane servers by administrators of LV1, administrators of the CIs, or application programs running at the CIs. In the depicted embodiment, respective network connections may be set up between each of the CIs (e.g., via BSVMs similar to those shown in FIG. 1, run at the virtualization hosts of the CIs) and each SS at which a partition of LV1 is stored. Each CI may also store a respective version of LV1's PRR, such as PRR 1718, PRR 1720 or PRR 1722. Note that in the embodiment depicted in FIG. 17 and FIG. 18, at a given point in time, the PRR versions at some of the SSs and/or some of the CIs may not be identical. Each version of a PRR may have an associated PR sequence number (PRSN), indicative of the most recent changes to LV1 reservation state that are incorporated within that version of the PRR.

Changes to the LV1 reservation state, such as revocation of read or write access from one or more attached CIs, may be initiated from at least two types of sources. Some such changes may be initiated from the attached CIs (e.g., based on commands originating at storage-accessing applications run at the CIs), while others may be initiated by administrators using control plane programmatic interfaces of the BSS. In the scenarios shown in FIG. 17 and FIG. 18, changes to LV1 reservation state are shown as being submitted (e.g., via mutation commands of the kind discussed above) from CI 1754.

Recall that SS 1706 is designated as the coordinator for LV1 state changes in the example scenario shown in FIG. 17. Accordingly, CI 1754 may submit a PRR mutation command, applicable to LV1's PRR (and indicating the PRSN known at CI 1754), to SS 1706 over the network connection between CI 1754 and SS 1706. This PR mutation command is represented by the arrow labeled "A" in FIG. 17. If the current version of the PRR for LV1 known at SS 1706 permits the requested mutation to reservation state, the requested mutation may be applied at SS 1706, resulting in a change to PRR 1712 and an incremented PRSN, and a response indicating that the PRR mutation has succeeded may be sent to CI 1754 as indicated by arrow "B". CI 1754 may store the new version of the PRR as PRR 1720, and update its PRSN to match the update applied to the PRSN at SS 1706. Note that the multiple locks for protecting updates to cached PRRs, as well as the operations journals, MHSs, CSNs and the like may all be employed in operations discussed in the context of FIG. 17 and FIG. 18; however, discussion of the use of these constructs and associated techniques is not repeated to avoid clutter while focusing on the fault tolerant protocol for updating reservation state.

According to the fault-tolerant protocol, the compute instance which initiates a change to reservation state may be responsible for propagating the updated reservation state to the SSs which are not the designated coordinator for the state changes. Recall that CI 1754 has already established network connectivity with non-coordinator SSs such as SS 1708 and 1710. Accordingly, after the requested changes to reservation state are applied and approved by SS 1706, and CI 1754 is informed that the changes have been applied, CI 1754 may send messages C and D to SS 1708 and SS 1710 respectively, indicating the newly-applied changes and the updated PRSN in the depicted embodiment. Messages C" and "D" may be referred to as PR_PUSH messages in some embodiments, indicating that they represent changes to the reservation state which are being pushed by the CI 1754 after the changes have been approved and applied at the designated coordinator SS 1706. SS 1708 may apply the changes locally, updating PRR 1714 and the local PRSN value, and send an acknowledgement message E to CI 1754. Similarly, SS 1710 may apply the changes locally, updating PRR 1716 and the local PRSN value, and send an acknowledgement message F to CI 1754. After receiving acknowledgements from all the SSs at which partitions of LV1 are stored, CI 1754 may in some embodiments inform the source application program (from which the reservation state change was initiated) that the reservation state has been successfully changed. Note that at this point, while the reservation state and PRSN has been updated at the SSs and at CI 1754, other attached CIs such as CI 1752 and CI 1756 may not yet have the latest reservation state information, and their PRSNs may be less than the PRSNs at CI 1754 or the SSs.

At some point after the operations illustrated in FIG. 17 have completed, one of the other attached CIs such as CI 1752 may submit an I/O command directed to one of the partitions of LV1. In FIG. 18, such an I/O command, sent from CI 1752 to SS 1708 and directed at LV1P1, is indicated by the arrow labeled "G". PRR 1718 may comprise an earlier version of the reservation metadata than is currently stored in PRR 1714 at SS 1708. A PRSN included in the I/O command sent from CI 1752 may therefore be lower than the PRSN stored in PRR 1714. At SS 1708, the PRR 1714 may be checked to determine whether the I/O command submitted from CI 1752 is permitted or not. If the I/O command is permitted, the corresponding read(s) and/or write(s) may be performed at SS 1708. A response message "H" sent from SS 1708 may indicate the new PRSN value, which differs from the PRSN value indicated in the I/O command that was sent from CI 1752, and hence from the PRSN stored in PRR 1718. Upon receiving the message "H", the fact that the PRSN (and hence the version of the PRR) stored at CI 1752 is stale may be discovered at CI 1752. Accordingly, CI 1752 may send a request (indicated as the arrow labeled "J") to SS 1706 (the designated coordinator for changes to reservation state metadata) for the latest version of the PRR (note that the PRR version stored at SS 1706 may already include changes that have not been seen at storage servers other than SS 1706). The latest PRR state may be provided to CI 1752 from SS 1706 in a message indicated by the arrow labeled "K".

Other attached compute instances, such as CI 1756, may also be provided the latest PRR version in a similar manner in various embodiments. In addition, in at least some embodiments, attached CIs may periodically poll the designated coordinator SS (SS 1706 in FIG. 18) to obtain the most recent version of the PRR. Note that, according to the approach illustrated in FIG. 17 and FIG. 18, the updating of the reservation state metadata at all the SSs and all the attached CIs may be accomplished using existing connections that would have been set up to enable I/O commands (and corresponding acknowledgements/results) to be transmitted between the CIs and the SSs, without any need for new connections between SSs or between CIs. The technique illustrated in FIG. 17 and FIG. 18 (along with the used of primary and non-primary SSs for each partition) is fault-tolerant in that even if some messages are lost or some SSs/CIs fail, the SSs and the CIs would eventually become aware (e.g., based on comparing PRSN values included in messages from SSs or CIs) that their local PRRs are out-of-date, and would then obtain the most recent PRR versions.

Figure 19:
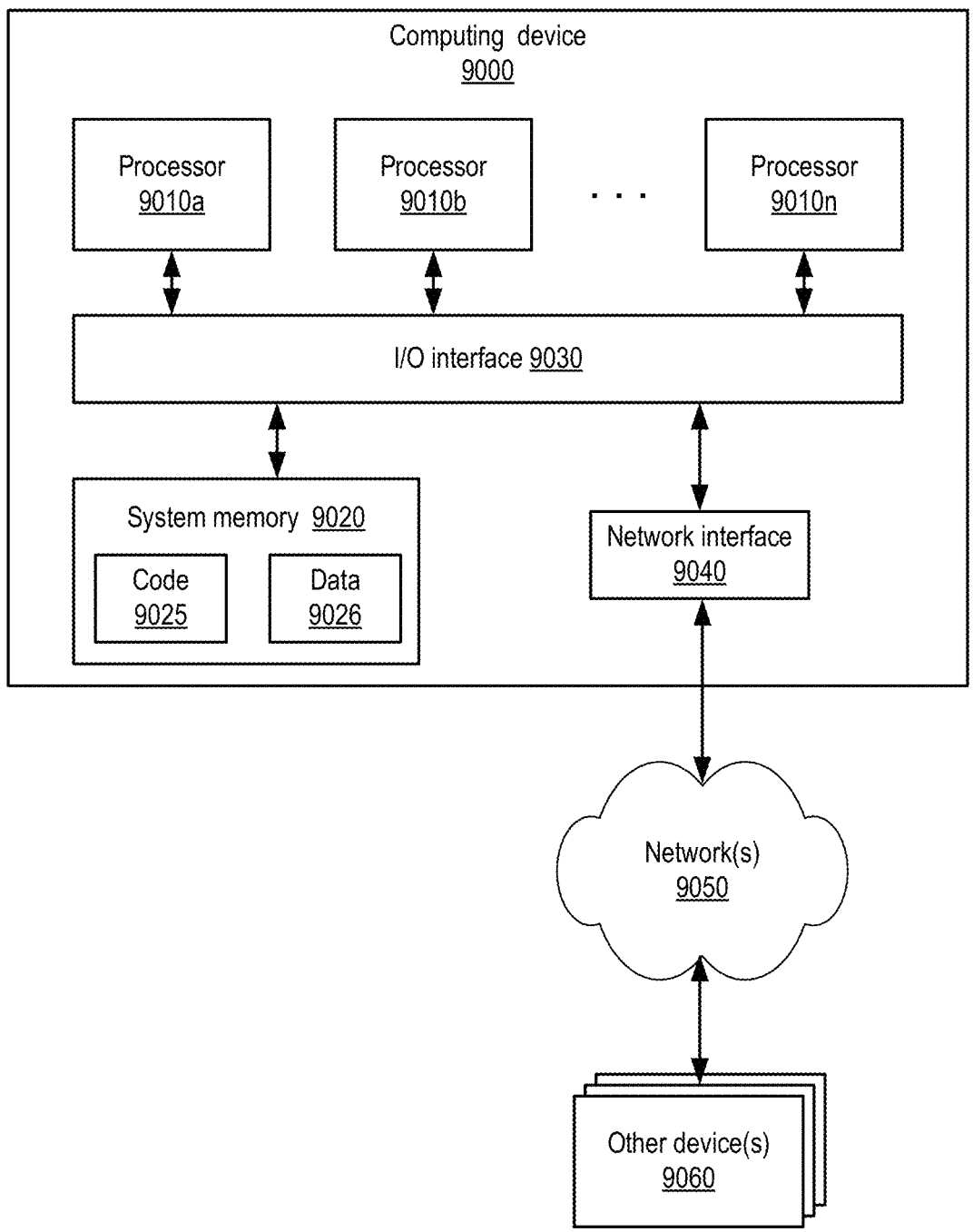
FIG. 19 is a block diagram illustrating an example computing device that may be used in at least some embodiments.

In at least some embodiments, a server that implements the types of techniques described herein (e.g., including the described functionality of BSS servers, VCS virtualization hosts and the like), may include a general-purpose computer system that includes or is configured to access one or more computer-accessible media. FIG. 19 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 18, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 18. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a first storage server of a block storage service of a cloud computing environment, wherein the first storage server comprises a processor, a main memory and a set of storage devices, wherein a plurality of worker threads run at the processor including a first worker thread and a second worker thread, wherein the set of storage devices comprises a portion of a logical volume, and wherein the set of storage devices comprises a first replica of an operations journal;
    a metadata store comprising a reservation record which indicates a set of access permissions granted, with respect to the logical volume, to one or more compute instances of a computing service which are programmatically attached to the logical volume; and
    a commit propagator;
    wherein, in response to determining that a command to modify the reservation record has been received at the first storage server, the first worker thread is configured to:
        acquire, in exclusive mode, a change-sequencing lock associated with the reservation record, wherein a first version of the reservation record is stored in a cache in the main memory of the first storage server, wherein the cache is populated by copying the first version from the metadata store, and wherein, while the change-sequencing lock is held in exclusive mode by the first worker thread, other worker threads are prevented from modifying the reservation record;
        acquire, in shared mode after acquiring the change-sequencing lock in exclusive mode, a reading-writing lock associated with the reservation record;
        release the reading-writing lock after generating, in accordance with the command to modify the reservation record, a second version of the reservation record, wherein the reading-writing lock is released without storing the second version of the reservation record in the cache;
        after verifying that respective entries comprising the second version of the reservation record have been stored in the first replica of the operations journal and in at least a second replica of the operations journal, provide an indication that the command to modify the reservation record has succeeded, without verifying that the second version of the reservation record has been stored in the metadata store;
        acquire the reading-writing lock in exclusive mode, wherein, while the reading-writing lock is held in exclusive mode by the first worker thread, other worker threads are prevented from reading the reservation record from the cache;
        store, while holding the reading-writing lock in exclusive mode, the second version of the reservation record in the cache;
        release the reading-writing lock and the change-sequencing lock; and wherein the second worker thread is configured to:
  determine that a command to perform an input/output (I/O) operation directed to the portion of the logical volume from a particular compute instance of the one or more compute instances has been received at the first storage server; and
  in response to (a) acquiring the reading-writing lock in shared mode while the change-sequencing lock is held in exclusive mode by the first worker thread and (b) determining that an access permission indicated in a particular version of the reservation record which is present in the cache permit the I/O operation, release the reading-writing lock and initiate the I/O operation; and
wherein the commit propagator is configured to:
  propagate, asynchronously with respect to storage of the second version of the reservation record in the cache at the first storage server, contents of the second version of the reservation record from a selected replica of the operations journal to the metadata store.

2. The system as recited in claim 1, further comprising a second storage server of the block storage service, wherein the first storage server is designated as a primary storage server for the portion of the logical volume, wherein the second storage server is designated as a non-primary storage server for the portion of the logical volume, wherein the second storage server stores a replica of the portion of the logical volume which is stored at the first storage server, wherein I/O commands targeting the portion of the logical volume are sent to the primary storage server and not to the non-primary storage server, and wherein a main memory of the non-primary storage server does not comprise a cache in which reservation records are stored.

3. The system as recited in claim 2, wherein the second storage server comprises a transition-to-primary-status manager configured to:
  in response to designation of the second storage server as the primary storage server for the portion of the logical volume, (a) copy, into a cache within the main memory of the second storage server, at least a portion of contents of the metadata store, including a particular version of the reservation record and (b) initialize, at the second storage server, a change-sequencing lock and a reading-writing lock for the reservation record.

4. The system as recited in claim 1, further comprising a second storage server of the block storage service, wherein the second replica of the operations journal is stored at the second storage server.

5. The system as recited in claim 1, wherein the reservation record indicates respective access permissions granted, with respect to the logical volume, to one or more compute instances in accordance with a version of an Non-Volatile Memory Express (NVMe) standard.

6. A computer-implemented method, comprising:
  determining, at a first worker thread of a plurality of worker threads of a first storage server of a storage service, that a command to modify a reservation record has been received, wherein the reservation record comprises access permissions to an object which is stored at least in part at the first storage server;
  acquiring, by the first worker thread in exclusive mode, a first lock of a plurality of locks associated with the reservation record, wherein a first version of the reservation record is stored in a cache maintained in main memory of the first storage server, wherein the cache is populated at least in part by copying the first version from a metadata store;
  acquiring, by the first worker thread in shared mode while holding the first lock in exclusive mode, a second lock of the plurality of locks;
  releasing the second lock by the first worker thread after generating, in accordance with the command to modify the reservation record, a second version of the reservation record, wherein the second lock is released without storing the second version in the cache;
  verifying, by the first worker thread, that respective entries comprising the second version of the reservation record have been stored in a plurality of replicas of an operations journal;
  acquiring, by the first worker thread, the second lock in exclusive mode after said verifying;
  storing, by the first worker thread while holding the second lock in exclusive mode, the second version of the reservation record in the cache;
  releasing, by the first worker thread, the second lock and the first lock; and
  causing, by the first worker thread, an indication that the command to modify the reservation record has succeeded to be transmitted, without verifying that the second version of the reservation record has been stored in the metadata store.

7. The computer-implemented method as recited in claim 6, further comprising:
  determining, at a second worker thread of the plurality of worker threads, that a command to perform an I/O operation directed to the object has been received; and
  initiating, by the second worker thread, while the first lock is held in exclusive mode by the first worker thread, the I/O operation in response to (a) acquiring the second lock in shared mode and (b) determining that access permissions indicated in a particular version of the reservation record which is present in the cache after the second lock is acquired in shared mode by the second worker thread allow the I/O operation.

8. The computer-implemented method as recited in claim 6, wherein the reservation record indicates respective access permissions granted to one or more clients of the storage service in accordance with a version of a Non-Volatile Memory Express (NVMe) standard.

9. The computer-implemented method as recited in claim 6, wherein the storage service comprises a block storage service, and wherein the object comprises a logical volume which is programmatically attached to one or more compute instances of a virtualized computing service.

10. The computer-implemented method as recited in claim 6, wherein the first storage server is designated as a coordinator of modifications to the reservation record, wherein the command to modify the reservation record is received from a compute instance of a virtualized computing service, wherein a particular access permission granted to the compute instance is stored in the reservation record, and wherein the request to modify the reservation record is generated at the compute instance based at least in part on input from an application.

11. The computer-implemented method as recited in claim 6, wherein a second storage server of the storage service is designated as a coordinator of modifications of the reservation record, wherein the command to modify the reservation record is received from a particular compute instance of a virtualized computing service, and wherein the request to modify the reservation record is transmitted from the particular compute instance after the particular compute instance is notified that one or more modifications indicated in the request to modify the reservation record have been performed at the second storage server.

12. The computer-implemented method as recited in claim 6, wherein the reservation record comprises a plurality of entries, including a first entry associated with a first compute instance which is programmatically attached to the object, and a second entry associated with a second compute instance which is programmatically attached to the object, the computer-implemented method further comprising:
   storing, at the first storage server, in a first connection record comprising metadata associated with a first network connection between the first compute instance and the first storage server, a pointer to the first entry associated with the first compute instance; and
   utilizing the pointer to access the first entry from the cache in response to receiving an I/O request from the first compute instance.

13. The computer-implemented method as recited in claim 6, wherein the plurality of replicas of the operations journal includes (a) a first replica at the first storage server and (b) a second replica at a second storage server of the storage service.

14. The computer-implemented method as recited in claim 13, further comprising:
   storing a primary replica of a particular partition of a plurality of partitions of the object at a first storage device at the first storage server, wherein the first replica of the operations journal is stored at a second storage device at the first storage server, and wherein the first storage server is designated as a primary storage server of the particular partition; and
   storing a non-primary replica of the particular partition of the object at a third storage device at the second storage server, wherein the second replica of the operations journal is stored at a fourth storage device at the second storage server, without maintaining a cache comprising the reservation record within a main memory of the second storage server, wherein the first storage server is designated as a non-primary storage server of the particular partition.

15. The computer-implemented method as recited in claim 14, further comprising:
   in response to designation of the second storage server as the primary storage server of the particular partition,
      copying, into a cache maintained in the main memory of the second storage server, another version of the reservation record; and
      initializing, at the second storage server, a plurality of locks to be used to manage operations directed to the reservation record.

16. A non-transitory computer-accessible storage medium storing program instructions that when executed on a processor:
   determine, at a first worker thread of a plurality of worker threads of a first storage server of a storage service, that a request to modify a reservation record has been received, wherein the reservation record comprises access permissions to an object which is stored at least in part at the first storage server;
   acquire, by the first worker thread in exclusive mode, a first lock of a plurality of locks associated with the reservation record, wherein a first version of the reservation record is stored in a cache maintained in main memory of the first storage server, wherein the cache is populated at least in part by copying the first version from a metadata store;
   acquire, by the first worker thread in shared mode while holding the first lock in exclusive mode, a second lock of the plurality of locks;
   release the second lock by the first worker thread after generating, in accordance with the request to modify the reservation record, a second version of the reservation record, wherein the second lock is released without storing the second version in the cache;
   verify, by the first worker thread, that respective entries comprising the second version of the reservation record have been stored in a plurality of replicas of an operations journal;
   acquire, by the first worker thread, the second lock in exclusive mode after verification that the respective entries comprising the second version have been stored;
   store, by the first worker thread while holding the second lock in exclusive mode, the second version of the reservation record in the cache;
   release, by the first worker thread, the second lock and the first lock; and
   cause, by the first worker thread, an indication that the request to update the reservation record has succeeded to be transmitted, without verifying that the second version of the reservation record has been stored in the metadata store.

17. The non-transitory computer-accessible storage medium as recited in claim 16, storing further program instructions that when executed on the processor:
   receive, at a second worker thread of the plurality of worker threads, a request to perform an I/O operation directed to the object; and
   initiate, by the second worker thread, while the first lock is held in exclusive mode by the first worker thread, the I/O operation in response to (a) acquiring the second lock in shared mode and (b) determining that access permissions indicated in a particular version of the reservation record which is present in the cache after the second lock is acquired in shared mode by the second worker thread allow the I/O operation.

18. The non-transitory computer-accessible storage medium as recited in claim 16, wherein the reservation record indicates respective access permissions granted to one or more clients of the storage service in accordance with a version of an Non-Volatile Memory Express (NVMe) standard.

19. The non-transitory computer-accessible storage medium as recited in claim 16, wherein the storage service comprises a block storage service, and wherein the object comprises a logical volume which is programmatically attached to one or more compute instances of a virtualized computing service.

20. The non-transitory computer-accessible storage medium as recited in claim 16, wherein the first storage server is designated as a coordinator of modifications to the reservation record, wherein the request to modify the reservation record is received from a compute instance of a virtualized computing service, wherein a particular access permission granted to the compute instance is stored in the reservation record, and wherein the request to modify the reservation record is generated at the compute instance based at least in part on input from an application.

* * * * *